US012630438B2

(12) United States Patent
Pedroso et al.

(10) Patent No.: US 12,630,438 B2
(45) Date of Patent: May 19, 2026

(54) PROCESS FOR PRODUCING PRECIPITATED CALCIUM CARBONATE IN THE PRESENCE OF NATURAL GROUND CALCIUM CARBONATE

(71) Applicant: Omya International AG, Oftringen (CH)

(72) Inventors: Luis Pedroso, Antanhol (PT); Aaro Salonen, Sierentz (FR); Marc Maurer, Village-Nuef (FR)

(73) Assignee: Omya International AG, Oftringen (CH)

( * ) Notice: Subject to any disclaimer, the term of this patent is extended or adjusted under 35 U.S.C. 154(b) by 636 days.

(21) Appl. No.: 18/246,411

(22) PCT Filed: Oct. 28, 2021

(86) PCT No.: PCT/EP2021/079964
§ 371 (c)(1),
(2) Date: Mar. 23, 2023

(87) PCT Pub. No.: WO2022/090384
PCT Pub. Date: May 5, 2022

(65) Prior Publication Data
US 2023/0357035 A1      Nov. 9, 2023

(30) Foreign Application Priority Data
Nov. 2, 2020      (EP) ..................................... 20205135

(51) Int. Cl.
*C01F 11/18*          (2006.01)
(52) U.S. Cl.
CPC ................................... *C01F 11/18* (2013.01)
(58) Field of Classification Search
CPC . C09C 1/02; C09C 1/021; C01F 11/18; C08K 3/26; C08K 2003/265; C01P 2004/61; C01P 2004/62; D21H 17/675; D21H 19/385; D21H 21/52
See application file for complete search history.

(56) References Cited

U.S. PATENT DOCUMENTS

| | | | |
|---|---|---|---|
| 3,897,519 A | 7/1975 | Hogberg et al. |
| 4,126,650 A | 11/1978 | Via et al. |
| 4,350,645 A | 9/1982 | Kurosaki et al. |
| 4,921,990 A | 5/1990 | Uphues et al. |
| 5,232,678 A | 8/1993 | Bleakley et al. |
| 5,332,564 A | 7/1994 | Chapnerkar et al. |
| 5,554,781 A | 9/1996 | Reierson |
| 5,558,850 A | 9/1996 | Bleakley et al. |
| 5,695,733 A | 12/1997 | Kroc et al. |
| 5,741,471 A | 4/1998 | Deutsch et al. |
| 5,811,070 A | 9/1998 | You |
| 6,294,143 B1 | 9/2001 | Deutsch et al. |
| 6,710,199 B2 | 3/2004 | Tsuyutani et al. |
| 2011/0035560 A1 | 2/2011 | Bodrozic et al. |

FOREIGN PATENT DOCUMENTS

| | | | | |
|---|---|---|---|---|
| EP | 0313483 A1 | 4/1989 | | |
| EP | 0844213 A1 | 5/1998 | | |
| EP | 1092000 B1 | 9/2004 | | |
| EP | 2537900 A1 | 12/2012 | | |
| EP | 2447213 A1 | 4/2015 | | |
| EP | 3002318 A1 | 4/2016 | | |
| EP | 3012223 A1 * | 4/2016 | .......... | D21H 17/675 |
| EP | 3061729 A1 | 8/2016 | | |
| EP | 3124436 A1 * | 2/2017 | .......... | C01F 11/181 |
| JP | 200874629 A | 4/2008 | | |
| WO | 9951691 A1 | 10/1999 | | |
| WO | 2004106236 A1 | 12/2004 | | |
| WO | 2005000742 A1 | 1/2005 | | |
| WO | 2006109168 A2 | 10/2006 | | |
| WO | 2006109171 A1 | 10/2006 | | |
| WO | 2008023076 A1 | 2/2008 | | |
| WO | 2010018432 A1 | 2/2010 | | |
| WO | 2011121065 A1 | 10/2011 | | |
| WO | 2013142473 A1 | 9/2013 | | |
| WO | 2016062682 A1 | 4/2016 | | |
| WO | WO-2016135059 A1 * | 9/2016 | ............ | C09C 1/021 |

OTHER PUBLICATIONS

Goss et al. (editors), "Pesticide Formulations and Application Systems", 17th Volume, 328 pages 1997.
International Search Report and Written Opinion in PCT/EP2021/079964, 9 pages. Feb. 14, 2022.

* cited by examiner

*Primary Examiner* — Pegah Parvini
(74) *Attorney, Agent, or Firm* — Heslin Rothenberg Farley & Mesiti P.C.

(57)          ABSTRACT

The present invention relates to a process for producing an aqueous suspension of precipitated calcium carbonate, an aqueous suspension of precipitated calcium carbonate obtainable by the process, a precipitated calcium carbonate obtainable by the process, a product comprising the precipitated calcium carbonate as well as the use of the natural ground calcium carbonate (NGCC) in a process for producing an aqueous suspension of precipitated calcium carbonate.

19 Claims, 4 Drawing Sheets

PROCESS FOR PRODUCING PRECIPITATED CALCIUM CARBONATE IN THE PRESENCE OF NATURAL GROUND CALCIUM CARBONATE

CROSS REFERENCE TO RELATED APPLICATIONS

This application is a U.S. National Phase filing under 35 U.S.C. § 371 of International Application PCT/EP2021/079964, filed Oct. 28, 2021, and published as WO2022/090384A1 on May 5, 2022. PCT/EP2021/079964 claims priority from European application number 20205135.5, filed Nov. 2, 2020. The entire contents of each of these prior applications are hereby incorporated herein by reference.

The present invention relates to a process for producing an aqueous suspension of precipitated calcium carbonate, an aqueous suspension of precipitated calcium carbonate obtainable by the process, a precipitated calcium carbonate obtainable by the process, a product comprising the precipitated calcium carbonate as well as the use of the natural ground calcium carbonate (NGCC) in a process for producing an aqueous suspension of precipitated calcium carbonate.

Calcium carbonate is one of the most commonly used additives in the paper, paint and plastics industries. While naturally occurring ground calcium carbonate (GCC) is usually used as a filler in many applications, synthetically manufactured precipitated calcium carbonate (PCC) may be tailor-made with respect to its morphology and particle size allowing PCC to fulfil additional functions.

Commonly known PCC production processes include the steps of slaking quicklime with water, whereby a suspension of fine particles of calcium hydroxide is formed, and subsequently precipitating calcium carbonate by passing carbon dioxide through the resulting calcium hydroxide suspension. The carbon dioxide dissolves and dissociates in the water, providing carbonate ions to react with the free calcium ions from the dissolved calcium hydroxide. This leads to an oversaturation of calcium carbonate in solution, resulting in the precipitation of calcium carbonate. As calcium carbonate forms, more calcium hydroxide dissolves. Therefore, the highest point of the calcium carbonate concentration is near the surface of the calcium hydroxide particles, and consequently, in this region the oversaturation is at its maximum.

In this regard, different methods have been developed for improving or changing the production of precipitated calcium carbonate in terms of yield, complexity of the process, morphology or characteristics such as particle size of the precipitated calcium carbonate.

For example, WO9951691 A1 describes a method of producing a precipitated calcium carbonate (PCC) product having a coarse crystalline form, which inter alia comprises the step of preparing a suspension in an aqueous medium of calcium hydroxide particles which partially dissolve, thus providing calcium ions in the aqueous medium, the aqueous medium also incorporating an agent which promotes release into solution in the aqueous medium of calcium ions from the calcium hydroxide, wherein said agent comprises a water-soluble organic compound.

U.S. Pat. No. 5,695,733 A discloses precipitated calcium carbonate particles in clustered form, which when used as fillers impart improved strength, opacity and other advantages to paper, and are prepared by a process involving adding lime and carbon dioxide to a reaction mixture containing seed material having a scalenohedral morphology, the lime and carbon dioxide being added simultaneously.

U.S. Pat. No. 5,741,471 A relates to a process for the precipitation of discrete prismatic calcium carbonate particles by carbonation of aqueous calcium hydroxide containing a saccharide, a polysaccharide, or a saccharide or polysaccharide and a metal ion.

U.S. Pat. No. 5,332,564 A describes a process for producing rhombic or barrel shaped precipitated calcium carbonate. Quicklime is slaked in an aqueous solution containing about 0.1% to about 2% by weight of a sugar, based upon the weight of the $CaCO_3$ to be produced.

U.S. Pat. No. 5,811,070 A discloses a process for producing calcium carbonate particles having an average size of 0.1 to 1.0 μm, the process comprising the steps of introducing carbon dioxide into a milk of lime containing a first reagent to prepare an aqueous suspension containing calcium carbonate particles of 0.4 μm in average size, adding a milk of lime into the aqueous suspension, and continuously reacting a carbonated solution containing a second reagent with the aqueous suspension.

WO2006109168 A2 and WO2006109171 A1 are concerned with a carbonation process using a reduced flow rate of carbon dioxide, which leads to porous agglomerates of precipitated calcium carbonate of a very specific structure and unique properties, followed by an up-concentration step to increase the solids content.

A process for preparing a precipitated calcium carbonate involving the use of a specific polymer during the carbonation step is disclosed in WO2010018432 A1.

WO2011121065 A1 discloses a process for preparing PCC comprising inter alia the step of preparing an aqueous suspension of PCC seeds by carbonating a suspension of calcium hydroxide in the presence of strontium hydroxide. A process for producing PCC, wherein the addition rate of the calcium carbonate slurry to the reaction vessel is such that a certain electrical conductivity is maintained in the reaction vessel, is described in EP2537900 A1.

US2011035560 A1 describes a method to manufacture PCC involving the use of a comb polymer, which reduces the carbonation time of the PCC. A grinding agent for grinding coarse lime is disclosed in EP0313483 A1. EP2447213 A1 relates to the production of high purity PCC involving the step of slaking lime with an aqueous ammonium chloride solution.

WO2013142473 A1 relates to a process comprising the steps of preparing slaking quick lime to obtain slaked lime, and subjecting the slaked lime, without agitation, without prior cooling in a heat exchanger, and in the absence of any additives, to carbonation with carbon dioxide gas to produce PCC. PCC production processes including additives are disclosed in U.S. Pat. Nos. 6,294,143, 5,232,678, and 5,558,850. A method for producing slaked lime by slaking lime with a polymer having anionic groups is described in JP2008074629 A. EP0844213 A1 discloses a method of producing a precipitate of an alkaline earth metal compound involving the use of a dispersing agent.

WO2010018432 A1 discloses a process to prepare precipitated calcium carbonate implementing low charge acrylate and/or maleinate-containing polymers. A process for producing platy precipitated calcium carbonate involving the step of adding a polyacrylate to a suspension of calcium hydroxide prior to the completion of carbonation is described in WO2005000742 A1. WO2004106236 A1 relates to a process for producing platy precipitated calcium carbonate involving the step of adding a dry condensed phosphate additive to a suspension of calcium hydroxide prior to the completion of carbonation.

WO2016062682 A1 refers to a process for producing an aqueous suspension of precipitated calcium carbonate comprising the steps of: i) providing a calcium oxide containing material, ii) providing a precipitation enhancer selected from the group consisting of calcium carbonate nanoparticles and/or a water-soluble calcium salt, iii) preparing a milk of lime by mixing water, the calcium oxide containing material of step i), and the precipitation enhancer of step ii), and iv) carbonating the milk of lime obtained from step iii) to form an aqueous suspension of precipitated calcium carbonate.

However, the known processes have the drawback that artificial additives differing from calcium carbonate such as polymers are typically introduced into the process, which are also present in the final precipitated calcium carbonate product. There are growing concerns regarding such artificial additives such that there is an ongoing need for processes providing precipitated calcium carbonate in excellent production volumes, and especially processes which avoid or reduce the use of artificial additives differing from calcium carbonate, while maintaining the characteristics of the precipitated calcium carbonate. Furthermore, the production of lime is highly energy-consuming and moreover during the lime calcination process high amounts of carbon dioxide are emitted from fuel combustion. Thus there is an ongoing need for processes for producing precipitated calcium carbonate, wherein a part of the lime is replaced by another compound, such that the overly process is less energy-consuming and/or emits less carbon dioxide.

Accordingly, it is an object of the present invention to provide a process for the production of precipitated calcium carbonate, which can be carried out with reduced amounts of or even without materials differing from calcium carbonate into the process. In addition thereto, it is desirable to provide a process for the production of precipitated calcium carbonate having good production volumes. Furthermore, it is desirable to provide a process for the production of precipitated calcium carbonate being more eco-friendly in terms of the emission of carbon dioxide and/or the consumption of energy. Furthermore, it is desirable to maintain or even improve the characteristics of the precipitated calcium carbonate, namely by keeping the weight median diameter $d_{50}$ equal and/or the BET specific surface area on a similar or even improved, i.e. lower, level. Furthermore, it is desirable to provide a process for the production of precipitated calcium carbonate, wherein a part of lime is replaced by another compound, while maintaining or even improving the characteristics of the precipitated calcium carbonate, namely by keeping the weight median diameter $d_{50}$ equal and/or the BET specific surface area on a similar or even improved, i.e. lower, level.

The foregoing and other objects are solved by the subject-matter as defined in the independent claims. Advantageous embodiments of the present invention are defined in the corresponding subclaims.

According to one aspect of the present invention, a process for producing an aqueous suspension of precipitated calcium carbonate is provided, the process comprising the steps of:

i) providing a calcium oxide containing material, ii) providing a natural ground calcium carbonate (NGCC) as precipitation additive, wherein the natural ground calcium carbonate (NGCC) has a weight median diameter $d_{50}$ of at least 0.3 μm, iii) preparing a milk of lime by mixing water, the calcium oxide containing material of step i), and the natural ground calcium carbonate (NGCC) of step ii), wherein the natural ground calcium carbonate (NGCC) is present in an amount ranging from >5 to 25 wt.-%, based on the total weight of the calcium oxide containing material, iv) carbonating the milk of lime obtained from step iii) to form an aqueous suspension of precipitated calcium carbonate.

According to one embodiment, step iii) comprises the steps of: a1) mixing the calcium oxide containing material of step i) with water, and a2) adding the natural ground calcium carbonate (NGCC) of step ii) to the mixture of step a1).

According to another embodiment, step iii) comprises the steps of a1) mixing the natural ground calcium carbonate (NGCC) of step ii) with water, and a2) adding the calcium oxide containing material of step i) to the mixture of step a1).

According to yet another embodiment, the natural ground calcium carbonate (NGCC) a) is selected from marble, limestone, chalk and mixtures thereof, and/or b) has a content of calcium carbonate of >90 wt.-%, preferably of ≥92 wt.-% and most preferably of ≥96 wt.-%, based on the total weight of the natural ground calcium carbonate (NGCC), and/or c) has a weight median diameter $d_{50}$ in the range from 0.3 to 10 μm, preferably from 0.5 to 8 μm, more preferably from 0.8 to 6 μm and most preferably from 1 to 4 μm.

According to another embodiment, a slaking additive is added before, during or after step iii), preferably the slaking additive is selected from the group consisting of organic acids, organic acid salts, sugar alcohols, monosaccharides, disaccharides, polysaccharides, gluconates, phosphonates, lignosulfonates, and mixtures thereof.

According to yet another embodiment, the slaking additive is added in an amount of ≤2 wt. %, based on the total amount of calcium oxide containing material, preferably from 0.01 to 1 wt.-%, more preferably from 0.01 to 0.5 wt.-%, and most preferably from 0.01 to 0.2 wt.-%.

According to one embodiment, the obtained suspension of precipitated calcium carbonate has a solids content of at least 5 wt. %, preferably from 5 to 50 wt.-%, more preferably from 10 to 45 wt.-%, and most preferably from 12 to 25 wt.-%, based on the total weight of the suspension.

According to another embodiment, the milk of lime is screened after step iii) and before step iv), preferably with a screen having a sieve size from 100 to 300 μm.

According to a further aspect of the present invention, a process for producing precipitated calcium carbonate comprising the steps i) to iv) of the process as defined herein is provided, and further a step v) of separating the precipitated calcium carbonate from the aqueous suspension obtained from step iv).

According to one embodiment, the process further comprises a step vi) of drying the separated precipitated calcium carbonate obtained from step v), and optionally a step vii) of contacting at least a part of the surface of the precipitated calcium carbonate with a surface-treatment agent.

According to still a further aspect of the present invention, an aqueous suspension of precipitated calcium carbonate obtainable by a process as defined herein is provided.

According to another aspect of the present invention, a precipitated calcium carbonate obtainable by a process as defined herein is provided.

According to one embodiment, the precipitated calcium carbonate is a dried calcium carbonate, optionally comprising a treatment layer on at least a part of the surface of the precipitated calcium carbonate.

According to still a further aspect of the present invention, a product comprising the precipitated calcium carbonate as defined herein is provided, preferably the product is a paper, a paper product, an ink, a paint, a coating, a plastic, a polymer composition, an adhesive, a building product, a foodstuff, an agricultural product, a cosmetic product or a pharmaceutical product, and more preferably the product is a plastic or a polymer composition.

According to still a further aspect of the present invention, use of natural ground calcium carbonate (NGCC) in a process for producing an aqueous suspension of precipitated calcium carbonate is provided, wherein the natural ground calcium carbonate (NGCC) has a weight median diameter $d_{50}$ of at least 0.3 µm.

It should be understood that for the purpose of the present invention, the following terms have the following meaning:

"Precipitated calcium carbonate" (PCC) in the meaning of the present invention is a synthesized material. PCC may be in the crystalline form of vaterite, calcite or aragonite.

The "particle size" of particulate materials herein is described by its weight-based distribution of particle sizes dx. Therein, the value dx represents the diameter relative to which x % by weight of the particles have diameters less than dx. This means that, for example, the $d_{20}$ value is the particle size at which 20 wt.-% of all particles are smaller than that particle size. The $d_{50}$ value is thus the weight median particle size, i.e. 50 wt.-% of all particles are smaller than this particle size. For the purpose of the present invention, the particle size is specified as weight median particle size $d_{50}$(wt) unless indicated otherwise. Particle sizes were determined by using Sedigraph™ 5120 instrument of Micromeritics Instrument Corporation. The method and the instrument are known to the skilled person and are commonly used to determine the particle size of fillers and pigments. The measurements were carried out in an aqueous solution of 0.1 wt.-% $Na_4P_2O_7$.

A "calcium oxide containing material" in the meaning of the present invention is a mineral or a synthetic material having a content of calcium oxide of at least 50 wt. %, preferably 75 wt.-%, more preferably 90 wt.-%, and most preferably 95 wt.-%, based on the total weight of the calcium oxide containing material. For the purpose of the present invention, a "mineral material" is a solid substance having a definite inorganic chemical composition and characteristic crystalline and/or amorphous structure The "solids content" of a liquid composition is a measure of the amount of material remaining after all the solvent or water has been evaporated. If necessary, the "solids content" of a suspension given in wt. % in the meaning of the present invention can be determined using a Moisture Analyzer HR73 from Mettler-Toledo (T=120° C., automatic switch off 3, standard drying) with a sample size of 5 to 20 g.

A "suspension" or "slurry" in the meaning of the present invention comprises undissolved solids and water, and optionally further additives, and usually contains large amounts of solids and, thus, is more viscous and can be of higher density than the liquid from which it is formed.

The term "aqueous" suspension refers to a system, wherein the liquid phase comprises, preferably consists of, water. However, said term does not exclude that the liquid phase of the aqueous suspension comprises minor amounts of at least one water-miscible organic solvent selected from the group comprising methanol, ethanol, acetone, acetonitrile, tetrahydrofuran and mixtures thereof. If the aqueous suspension comprises at least one water-miscible organic solvent, the liquid phase of the aqueous suspension comprises the at least one water-miscible organic solvent in an amount of from 0.1 to 40.0 wt.-% preferably from 0.1 to 30.0 wt.-%, more preferably from 0.1 to 20.0 wt.-% and most preferably from 0.1 to 10.0 wt.-%, based on the total weight of the liquid phase of the aqueous suspension. For example, the liquid phase of the aqueous suspension consists of water.

Where an indefinite or definite article is used when referring to a singular noun, e.g., "a", "an" or "the", this includes a plural of that noun unless anything else is specifically stated.

Where the term "comprising" is used in the present description and claims, it does not exclude other elements. For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This, for example, means that, unless the context clearly dictates otherwise, the term "obtained" does not mean to indicate that, for example, an embodiment must be obtained by, for example, the sequence of steps following the term "obtained" though such a limited understanding is always included by the terms "obtained" or "defined" as a preferred embodiment.

Whenever the terms "including" or "having" are used, these terms are meant to be equivalent to "comprising" as defined hereinabove.

The inventive process for producing an aqueous suspension of precipitated calcium carbonate comprises the steps of i) providing a calcium oxide containing material, ii) providing a natural ground calcium carbonate (NGCC) as precipitation additive, wherein the natural ground calcium carbonate (NGCC) has a weight median diameter $d_{50}$ of at least 0.3 µm, iii) preparing a milk of lime by mixing water, the calcium oxide containing material of step i), and the natural ground calcium carbonate (NGCC) of step ii), wherein the natural ground calcium carbonate (NGCC) is present in an amount ranging from >5 to 25 wt.-%, based on the total weight of the calcium oxide containing material, iv) carbonating the milk of lime obtained from step iii) to form an aqueous suspension of precipitated calcium carbonate.

The inventive process can be carried out without introducing materials differing from calcium carbonate into the process and thus the obtained precipitated calcium carbonate is free of artificial polymers, if needed. Furthermore, the characteristics of the precipitated calcium carbonate are maintained or even improved, namely the weight median diameter $d_{50}$ is equal and/or the BET specific surface area is kept on a similar or even improved, i.e. lower, level compared to processes using materials differing from calcium carbonate.

In the following details and preferred embodiments of the inventive process will be set out in more details. It is to be understood that these technical details and embodiments also apply to the inventive use as well as to the inventive products and their use.

Process Step i): Provision of a Calcium Oxide Containing Material

According to step i) of the process of the present invention, a calcium oxide containing material is provided.

The calcium oxide containing material of step i) can be obtained by calcining a calcium carbonate containing material. Calcination is a thermal treatment process applied to calcium carbonate containing materials in order to bring about a thermal decomposition resulting in the formation of calcium oxide and gaseous carbon dioxide. Calcium carbonate containing materials which may be used in such a calcinations process are those selected from the group comprising precipitated calcium carbonates, natural calcium carbonate containing minerals such as marble, limestone and chalk, and mixed alkaline earth carbonate minerals comprising calcium carbonate such as dolomite, or calcium carbonate rich fractions from other sources. It is also possible to subject a calcium carbonate containing waste material to a calcinations process in order to obtain a calcium oxide containing material.

Calcium carbonate decomposes at about 1 000° C. to calcium oxide (commonly known as quicklime). The calcination step may be carried out under conditions and using equipment well-known to the person skilled in the art. Generally, calcination may be carried out in furnaces or reactors (sometimes referred to as kilns) of various designs including shaft furnaces, rotary kilns, multiple hearth furnaces, and fluidized bed reactors.

The end of the calcination reaction may be determined, e.g. by monitoring the density change, the residual carbonate content, e.g. by X-ray diffraction, or the slaking reactivity by common methods.

According to one embodiment of the present invention, the calcium oxide containing material of step i) is obtained by calcining a calcium carbonate containing material, preferably selected from the group consisting of precipitated calcium carbonate, natural calcium carbonate minerals such as marble, limestone and chalk, mixed alkaline earth carbonate minerals comprising calcium carbonate such as dolomite, and mixtures thereof.

For reasons of efficiency, it is preferred that the calcium oxide containing material has a minimum calcium oxide content of at least 75 wt.-%, preferably at least 90 wt.-%, and most preferably 95 wt.-%, based on the total weight of the calcium oxide containing material. According to one embodiment, the calcium oxide containing material consists of calcium oxide.

The calcium oxide containing material can consist of only one type of calcium oxide containing material. Alternatively, the calcium oxide containing material can consist of a mixture of two or more types of calcium oxide containing materials.

The calcium oxide containing material can be used in the inventive process in its original form, i.e. as a raw material, for example, in form of smaller and bigger chunks. Alternatively, the calcium oxide containing material can be ground before use. According to one embodiment of the present invention, the calcium oxide containing material is in forms of particles having weight median particle size $d_{50}$ from 0.1 to 1 000 µm, and preferably from 1 to 500 µm. Process Step ii): Provision of a Natural Ground Calcium Carbonate (NGCC) as Precipitation Additive According to step ii), a natural ground calcium carbonate (NGCC) is provided as precipitation additive, wherein the natural ground calcium carbonate (NGCC) has a weight median diameter $d_{50}$ of at least 0.3 µm.

"Natural ground calcium carbonate" (also called "sedimentary natural ground calcium carbonate") (NGCC) in the meaning of the present invention is a calcium carbonate obtained from sedimentary sources, such as marble, limestone, chalk and/or mixtures thereof, and processed through a wet and/or dry treatment such as grinding, screening and/or fractionating, for example, by a cyclone or classifier. According to one embodiment, the natural ground calcium carbonate (NGCC) is selected from the group consisting of marble, limestone, chalk and mixtures thereof. The ground calcium carbonate may comprise further components occurring in sedimentary sources such as magnesium carbonate, alumino silicate etc. Thus, it is appreciated that the term natural "ground" calcium carbonate is not understood to refer to a calcium carbonate obtained by milling, but rather refers to the sedimentary origin of the calcium carbonate.

Preferably, the natural ground calcium carbonate is a sedimentary natural ground calcium carbonate (NGCC). The term "sedimentary" ground calcium carbonate refers to calcium carbonate that is formed by the accumulation or deposition of calcium carbonate particles and subsequent cementation of the particles on the floor of oceans or other bodies of water at the earth's surface.

It is preferred that the natural ground calcium carbonate (NGCC) is selected from the group consisting of marble, limestone, dolomite, chalk and mixtures thereof.

Preferably, the natural ground calcium carbonate (NGCC) is marble, limestone or chalk. More preferably, the natural ground calcium carbonate (NGCC) is marble or limestone. Most preferably, the natural ground calcium carbonate (NGCC) is marble.

The natural ground calcium carbonate (NGCC) preferably has a content of calcium carbonate of >90 wt.-%, based on the total weight of the natural ground calcium carbonate (NGCC). For example, the natural ground calcium carbonate (NGCC) has a content of calcium carbonate of 92 wt.-% and most preferably of 96 wt.-%, based on the total weight of the natural ground calcium carbonate (NGCC).

It is one requirement of the present invention that the natural ground calcium carbonate (NGCC) must have a weight median diameter $d_{50}$ of at least 0.3 µm. It is appreciated that such weight median diameter $d_{50}$ is especially favourable for obtaining the precipitated calcium carbonate of the present invention. For example, the natural ground calcium carbonate (NGCC) has a weight median diameter $d_{50}$ in the range from 0.3 to 10 µm, preferably from 0.5 to 8 µm, more preferably from 0.8 to 6 µm and most preferably from 1 to 4 µm.

In a preferred embodiment, the natural ground calcium carbonate (NGCC) has a weight median diameter $d_{50}$ of at least 0.3 µm, and is selected from marble, limestone, chalk and mixtures thereof, preferably marble.

According to one embodiment, the natural ground calcium carbonate (NGCC) is selected from marble, limestone, chalk and mixtures thereof, and/or b) has a content of calcium carbonate of >90 wt.-%, preferably of 92 wt.-% and most preferably of 96 wt.-%, based on the total weight of the natural ground calcium carbonate (NGCC), and/or c) has a weight median diameter $d_{50}$ in the range from 0.3 to 10 µm, preferably from 0.5 to 8 µm, more preferably from 0.8 to 6 µm and most preferably from 1 to 4 µm.

For example, the natural ground calcium carbonate (NGCC) is selected from marble, limestone, chalk and mixtures thereof, or b) has a content of calcium carbonate of >90 wt.-%, preferably of >92 wt.-% and most preferably of ≥96 wt.-%, based on the total weight of the natural ground calcium carbonate (NGCC), or c) has a weight median diameter $d_{50}$ in the range from 0.3 to 10 µm, preferably from 0.5 to 8 µm, more preferably from 0.8 to 6 µm and most preferably from 1 to 4 µm.

Alternatively, the natural ground calcium carbonate (NGCC) is selected from marble, limestone, chalk and mixtures thereof, and b) has a content of calcium carbonate of >90 wt.-%, preferably of ≥92 wt.-% and most preferably of ≥96 wt.-%, based on the total weight of the natural ground calcium carbonate (NGCC), and c) has a weight median diameter $d_{50}$ in the range from 0.3 to 10 µm, preferably from 0.5 to 8 µm, more preferably from 0.8 to 6 µm and most preferably from 1 to 4 µm.

For example, the natural ground calcium carbonate (NGCC) a) is marble, and b) has a content of calcium carbonate of ≥96 wt.-%, based on the total weight of the natural ground calcium carbonate (NGCC), and c) has a weight median diameter $d_{50}$ of at least 0.3 µm, preferably in the range from 0.3 to 10 µm, more preferably from 0.5 to 8 µm, even more preferably from 0.8 to 6 µm and most preferably from 1 to 4 µm.

It is preferred that the natural ground calcium carbonate (NGCC) a) is marble, and b) has a content of calcium carbonate of ≥96 wt.-%, based on the total weight of the natural ground calcium carbonate (NGCC), and c) has a weight median diameter $d_{50}$ in the range from 1 to 4 µm.

Additionally or alternatively, the natural ground calcium carbonate (NGCC) has a top cut ($d_{98}$) measured by the sedimentation method of ≤30 µm, preferably of ≤20 µm, more preferably of ≤15 µm even more preferably of ≤10 µm, and most preferably of ≤8 µm.

In a preferred embodiment, the natural ground calcium carbonate (NGCC) has a weight median diameter $d_{50}$ of at least 0.3 µm, preferably in the range from 0.3 to 10 µm, more preferably from 0.5 to 8 µm, even more preferably from 0.8 to 6 µm and most preferably from 1 to 4 µm and has a top cut ($d_{98}$) measured by the sedimentation method of ≤30 µm, preferably of ≤20 µm, more preferably of ≤15 µm, even more preferably of ≤10 µm, and most preferably of ≤8 µm.

Additionally or alternatively, the natural ground calcium carbonate (NGCC) has a specific surface area (BET) of from 0.5 to 150 m²/g as measured using nitrogen and the BET method according to ISO 9277:2010, preferably from 1 to 80 m²/g, more preferably from 2 to 40 m²/g, most preferably from 3 to 25 m²/g, e.g. from 6 to 25 m²/g.

If the natural ground calcium carbonate (NGCC) to be used does not yet have the desired or required fineness, i.e., particle size, it may be ground in one or more wet or dry grinding steps, preferably several grinding steps, e.g., two dry and/or wet steps, preferably aqueous grinding steps, to yield the corresponding weight median diameter. However, the natural ground calcium carbonate (NGCC) of the present invention can be produced by any method known in the art.

The grinding may be performed in any of the known grinding equipment with which those skilled in the art are familiar for grinding calcium carbonate. Conventional ball mills are especially suitable for dry grinding; as well as attritor mills are suitable for wet grinding and combinations of such mills or combinations of one or more such mills with cyclones and screens are also very suitable.

Especially conventional attritor mills such as those distributed by the company Dynomill are suitable for wet grinding.

In the case of dry grinding, preferably ball mills are used and preferably iron and/or ceramic beads with a diameter of 0.5 to 10 cm are used as grinding media, especially preferably iron-cylpebs with a diameter of 2.5 cm are used.

Grinding balls made of, e.g., zirconium silicate, zirconium dioxide and/or baddeleite with a diameter of 0.2 to 5 mm, preferably 0.2 to 2 mm, but also 0.5 to 5 mm, e.g., 0.5 to 2 mm, are preferred for wet grinding. Quartz sand having an equivalent spherical diameter of 0.1 to 2 mm may also be used.

The natural ground calcium carbonate (NGCC) of the present invention, however, is preferably produced by wet grinding and is brought to the desired equivalent diameter.

Both dry and wet grinding steps may be performed one after the other, but then the last grinding step is preferably a wet grinding.

The natural ground calcium carbonate (NGCC) can be added in any form suitable for introducing the natural ground calcium carbonate (NGCC) into process step iii). For example, the natural ground calcium carbonate (NGCC) can be added in solid (i.e. powder) form or in form of an aqueous suspension. If the natural ground calcium carbonate (NGCC) is added in form of an aqueous suspension, the natural ground calcium carbonate (NGCC) may be present in the aqueous suspension in an amount ranging from 10 to 90 wt.-%, based on the total weight of the aqueous suspension, preferably from 10 to 70 wt.-% and most preferably from 20 to 60 wt.-%, e.g. from 30 to 50 wt.-%.

Preferably, the natural ground calcium carbonate (NGCC) is added in step iii) in form of an aqueous suspension having a content of natural ground calcium carbonate (NGCC) from 30 to 50 wt.-%, based on the total weight of the aqueous suspension.

Process Step iii): Preparation of a Milk of Lime

According to step iii), a milk of lime is prepared by mixing water, the calcium oxide containing material of step i), and the natural ground calcium carbonate (NGCC) of step ii), wherein the natural ground calcium carbonate (NGCC) is present in an amount ranging from >5 to 25 wt.-%, based on the total weight of the calcium oxide containing material.

The reaction of the calcium oxide containing material of step i) with water results in the formation of a milky calcium hydroxide suspension, better known as milk of lime. Said reaction is highly exothermic and is also designated as "lime slaking" in the art.

According to one embodiment of the present invention, the temperature of the water, which is used in mixing step iii), i.e. the temperature of the water that is used to slake the calcium oxide containing material, is adjusted to be in the range from more than 0° C. and less than 100° C. In other words, the water that is used to slake the calcium oxide containing material is adjusted to a temperature range, in which the water is in liquid form. Preferably, the temperature of the water, which is employed in mixing step iii) is adjusted to be from 1° C. to 70° C., more preferably from 2° C. to 50° C., even more preferably from 30° C. to 50° C., and most preferably from 35 to 45° C. It will be apparent to the skilled person that the initial temperature of the water is not necessarily the same one as the temperature of the mixture prepared in step iii) due to the highly exothermic slaking reaction and/or due to the mixing of substances having different temperatures.

According to one embodiment, step iii) comprises the steps of:
- a1) mixing the calcium oxide containing material of step i) with water, and
- a2) adding the natural ground calcium carbonate (NGCC) of step ii) to the mixture of step a1).

Preferably, process step a2) is carried out after the reaction between the calcium oxide containing material of step i) with water is completed, i.e. after the lime has been completely slaked.

According to another embodiment, process step iii) comprises the steps of:
- b1) mixing the natural ground calcium carbonate (NGCC) of step ii) with water, and
- b2) adding the calcium oxide containing material of step i) to the mixture of step b1).

According to still another embodiment, in step iii) the calcium oxide containing material of step i), the natural ground calcium carbonate (NGCC) of step ii), and water are mixed simultaneously.

The natural ground calcium carbonate (NGCC) of step ii) may be added in step iii) in one portion or in several portions. According to one embodiment, in step iii) the natural ground calcium carbonate (NGCC) of step ii) is mixed with the water, and the calcium oxide containing material of step i), by adding the natural ground calcium carbonate (NGCC) in one portion or in two, three, four, five, or more portions. Preferably, in step iii) the natural ground calcium carbonate (NGCC) of step ii) is mixed with the water, and the calcium oxide containing material of step i), by adding the natural ground calcium carbonate (NGCC) in one portion.

If the natural ground calcium carbonate (NGCC) is added to a mixture obtained by mixing the calcium oxide containing material of step i) with water, the natural ground calcium carbonate (NGCC) can be added in one or more portions before or after initiating process step iv), i.e. carbonating of the milk of lime. For example, the natural ground calcium carbonate (NGCC) is added in one or more portions after initiating process step iv), i.e. carbonating of the milk of lime.

It is appreciated that the natural ground calcium carbonate (NGCC) is present in step iii) in an amount ranging from >5 to 25 wt.-%, based on the total weight of the calcium oxide containing material. For example, the natural ground calcium carbonate (NGCC) is present in step iii) in an amount ranging from 7 to 23 wt.-%, preferably from 9 to 21 wt.-% and most preferably from 11 to 21 wt-%, based on the total weight of the calcium oxide containing material.

Process step iii) may be performed at room temperature, i.e. at a temperature of 20° C.±2° C., or at an initial temperature of 30 to 50°, preferably 35 to 45° C. Since the reaction is exothermic, the temperature typically raises to a temperature between 7° and 95° C. during step iii). According to a preferred embodiment, process step iii) is performed with mixing, agitation, or stirring, for example, mechanical stirring. Suitable process equipment for mixing, agitation or stirring is known to the skilled person.

The progress of the slaking reaction may be observed by measuring the temperature and/or conductivity of the reaction mixture. It can also be monitored by turbidity control. Alternatively or additionally, the progress of the slaking reaction can be inspected visually.

According to one embodiment, the calcium oxide containing material and the water are mixed in a mass ratio from 1:4 to 1:15. According to one preferred embodiment, in step iii) the calcium oxide containing material and the water are mixed in a mass ratio from 1:5 to 1:9.

According to one embodiment, the milk of lime of step iii) has a solids content of at least 5 wt. %, preferably from 5 to 50 wt.-%, more preferably from 10 to 45 wt.-%, and most preferably from 12 to 25 wt.-%, based on the total weight of the milk of lime.

According to one embodiment, the milk of lime of step iii) has a Brookfield viscosity from 1 to 500 mPa·s at 25° C., more preferably from 5 and 300 mPa·s at 25° C., and most preferably from 10 and 100 mPa·s at 25° C. According to one embodiment, the Brookfield viscosity is measured at 100 rpm.

It is within the confines of the present invention that additional water may be introduced during the slaking reaction in order to control and/or maintain and/or achieve the desired solids content or Brookfield viscosity or temperature of the milk of lime.

Process step iii) can be carried out in form of a batch process, a semi-continuous or a continuous process.

In one embodiment, a slaking additive is added before, during or after step iii). For example, the slaking additive is added before or during step iii). Preferably, the slaking additive is added during step iii).

If present, the slaking additive is preferably selected from the group consisting of organic acids, organic acid salts, sugar alcohols, monosaccharides, disaccharides, polysaccharides, gluconates, phosphonates, lignosulfonates, and mixtures thereof.

According to one embodiment of the present invention, the slaking additive is selected from the group consisting of sodium citrate, potassium citrate, calcium citrate, magnesium citrate, monosaccharides, disaccharides, polysaccharides, sucrose, sugar alcohols, meritol, citric acid, sorbitol, sodium salt of diethylene triamine pentaacetic acid, gluconates, phosphonates, sodium tartrate, sodium lignosulfonate, calcium lignosulfonate, and mixtures thereof. According to a preferred embodiment, the slaking additive is sodium citrate and/or saccharose. More preferably, the slaking additive is saccharose.

According to one embodiment of the present invention, the slaking additive consists of one type of slaking additive only. Alternatively, the slaking additive can consist of a mixture of two or more types of slaking additives. However, it is preferred that the slaking additive consists of one type of slaking additive only.

The slaking additive is preferably added in step iii) in an amount of ≤2 wt.-%, based on the total amount of calcium oxide containing material. Preferably, the slaking additive is added in step iii) in an amount from 0.01 to 1 wt.-%, more preferably from 0.01 to 0.5 wt.-%, and most preferably from 0.01 to 0.2 wt.-%, based on the total amount of calcium oxide containing material.

It is appreciated that the slaking additive can be added in any form suitable for introducing the slaking additive into process step iii). For example, the slaking additive can be added in solid (i.e. crystal) form or in form of an aqueous solution. If the slaking additive is added in form of an aqueous solution, the slaking additive may be present in the aqueous solution in an amount ranging from 10 to 90 wt.-%, based on the total weight of the aqueous solution, preferably from 10 to 70 wt.-% and most preferably from 20 to 60 wt.-%.

By adding a slaking additive, the size of the PCC particles and their crystal morphology can be controlled without affecting the viscosity of the aqueous suspension.

The milk of lime may be screened in order to remove oversize particles. A suitable screen can include, for example, a screen having a sieve size from 700 to 100 μm, for example, about 100 or about 300 μm. According to one embodiment of the present invention, the milk of lime is screened after step iii) and before step iv), preferably with a screen having a sieve size from 100 to 300 μm.

In one embodiment the process of the present invention may thus comprise a step of screening the milk of lime after step iii) and before step iv). Preferably, the process of the present invention comprises a step of screening the milk of lime after step iii) and before step iv) with a screen having a sieve size from 100 to 300 μm.

Process Step iv): Carbonation of the Milk of Lime

According to step iv), the milk of lime obtained from step iii) is carbonated to form an aqueous suspension of precipitated calcium carbonate.

The carbonation is carried out by means and under conditions well-known by the person skilled in the art. The introduction of carbon dioxide into the milk of lime quickly results in the formation of the carbonate ion ($CO_3^{2-}$), and thus, the requisite concentration for calcium carbonate to be formed.

Particularly, the carbonation reaction can be readily controlled considering the reactions involved in the carbonation process. Carbon dioxide dissolves according to its partial pressure forming carbonate ions via the formation of carbonic acid ($H_2CO_3$), and hydrogen carbonate ions ($HCO_3^-$) being unstable in the alkaline solution. Upon continued dissolution of carbon dioxide, hydroxide ions are consumed and the concentration of carbonate ions increases until the concentration of dissolved calcium carbonate exceeds the solubility product and solid calcium carbonate precipitates.

According to one embodiment of the present invention, in step iv) the carbonation is carried out by feeding pure gaseous carbon dioxide or technical gases containing at least 10 vol.-% of carbon dioxide into the milk of lime.

The progress of the carbonation reaction can be readily observed by measuring the conductivity, density, turbidity and/or pH. In this respect, the pH of the milk of lime before addition of carbon dioxide will be more than 10, usually between 11 and 12.5, and will constantly decrease until a pH of about 7 is reached. At this point the reaction can be stopped.

Conductivity slowly decreases during the carbonation reaction and rapidly decreases to low levels, when the precipitation is completed. The progress of the carbonation may be monitored by measuring the pH and/or the conductivity of the reaction mixture.

According to one embodiment of the present invention, the temperature of the milk of lime obtained from step iii), which is used in step iv) is adjusted to be in the range from 20° C. to 65° C. and preferably from 30° C. to 55° C. It will be apparent to the skilled person that the initial temperature of the milk of lime is not necessarily the same one as the temperature of the mixture prepared in step iii) due to the exothermic carbonation reaction and/or due to the mixing of substances having different temperatures.

According to one embodiment of the present invention, step iv) is initiated at a temperature from 5 to 95° C., preferably from 30 to 70° C., and more preferably from 40 to 60° C.

It is appreciated that the temperature during process step iv) may vary in a great range. However, the temperature during process step iv) is typically in the range from 15 to 95° C., preferably from 30 to 85° C., and more preferably from 45 to 80° C.

Process step iv) is preferably carried out in form of a batch process. According to one embodiment, the process of the present invention involving the process steps i) to iv) is carried out in form of a batch process, a semi-continuous or a continuous process.

According to one embodiment of the present invention, the obtained precipitated calcium carbonate has a weight median diameter $d_{50}$ from 0.1 to 50 μm, preferably from 0.25 to 20 μm, more preferably from 0.3 to 5 μm, and most preferably from 0.4 to 4.0 μm.

The precipitated calcium carbonate obtained by the inventive process preferably has a scalenohedral crystal structure, more preferably a clustered scalenohedral crystal structure.

More precisely, the precipitated calcium carbonate obtained by the inventive process preferably has a scalenohedral crystal structure and is in admixture with natural ground calcium carbonate (NGCC). More preferably, the precipitated calcium carbonate forms a clustered scalenohedral crystal structure in admixture with natural ground calcium carbonate (NGCC). In particular, it is to be noted that the precipitated calcium carbonate obtained by the inventive process are a clustered scalenohedral crystal structure, wherein the natural ground calcium carbonate (NGCC) particles cover the precipitated calcium carbonate particles and are worn out from the precipitated calcium carbonate particles. In view of this, the precipitated calcium carbonate obtained by the inventive process forms a composite comprising, preferably consisting of, precipitated calcium carbonate having a scalenohedral crystal structure, more preferably a clustered scalenohedral crystal structure, and natural ground calcium carbonate (NGCC).

In this regard, it is observed for the precipitated calcium carbonate obtained by the inventive process that the natural ground calcium carbonate (NGCC) forms a core, whereas the scalenohedral crystal structure of the precipitated calcium carbonate covers and/or extends from the natural ground calcium carbonate (NGCC). Thus, the natural ground calcium carbonate (NGCC) of the precipitated calcium carbonate obtained by the inventive process is typically not observable in SEM measurements. It is thus appreciated that the natural ground calcium carbonate (NGCC) and the scalenohedral crystal structure of the precipitated calcium carbonate obtained by the inventive process preferably are closely associated with each other such that they can be only separated from each other by breaking up the structure and destroying the precipitated calcium carbonate.

The precipitated calcium carbonate obtained by the inventive process can be differentiated from a mixture of precipitated calcium carbonate and natural ground calcium carbonate (NGCC) obtained by simply mixing precipitated calcium carbonate and natural ground calcium carbonate (NGCC) in that the natural ground calcium carbonate (NGCC) is observable in SEM measurements. Furthermore, the precipitated calcium carbonate and natural ground calcium carbonate (NGCC) in such a mixture can be visualized without breaking up the structure and destroying the precipitated calcium carbonate.

The BET specific surface area of the precipitated calcium carbonate obtained by the process according to the present invention may be from 1 to 50 m$^2$/g, preferably from 2 to 40 m$^2$/g, more preferably from 2.5 to 30 m$^2$/g, especially from 2.8 to 15 m$^2$/g, measured using nitrogen and the BET method according to ISO 9277.

Preferably, the precipitated calcium carbonate obtained by the process according to the present invention has a BET specific surface area from 1 to 50 m$^2$/g, preferably from 2 to 40 m$^2$/g, more preferably from 2.5 to 30 m$^2$/g, especially from 2.8 to 15 m$^2$/g, measured using nitrogen and the BET method according to ISO 9277, and a weight median diameter $d_{50}$ from 0.1 to 50 μm, preferably from 0.25 to 20 μm, more preferably from 0.3 to 5 μm, and most preferably from 0.4 to 4.0 μm. For example, the precipitated calcium carbonate obtained by the process according to the present invention has a BET specific surface area from 2.8 to 15 m$^2$/g, measured using nitrogen and the BET method according to ISO 9277, and a weight median diameter $d_{50}$ from 0.4 to 4.0 μm.

According to one embodiment of the present invention, the obtained suspension of precipitated calcium carbonate has a solids content of at least 5 wt.-%, preferably from 5 to 50 wt.-%, more preferably from 10 to 45 wt.-%, and most preferably from 12 to 25 wt.-%, based on the total weight of the suspension.

According to one embodiment of the present invention, the suspension of PCC of step iv) has a Brookfield viscosity of less than or equal to 500 mPa·s at 25° C., more preferably less than or equal to 300 mPa·s at 25° C., and most preferably less than or equal to 100 mPa·s at 25° C. The Brookfield viscosity may be measured at 100 rpm.

According to a further aspect of the present invention, a process for producing precipitated calcium carbonate is provided, the process comprising the steps of:
- i) providing a calcium oxide containing material,
- ii) a natural ground calcium carbonate (NGCC) as precipitation additive, wherein the natural ground calcium carbonate (NGCC) has a weight median diameter $d_{50}$ of at least 0.3 μm,
- iii) preparing a milk of lime by mixing water, the calcium oxide containing material of step i), and the natural ground calcium carbonate (NGCC) of step ii), wherein the natural ground calcium carbonate (NGCC) is present in an amount ranging from >5 to 25 wt.-%, based on the total weight of the calcium oxide containing material,
- iv) carbonating the milk of lime obtained from step iii) to form an aqueous suspension of precipitated calcium carbonate, and
- v) separating the precipitated calcium carbonate from the aqueous suspension obtained from step iv).

For the purpose of the present invention, the expression "separating" means that the PCC is removed or isolated from the aqueous suspension obtained from step iv) of the inventive process. The precipitated calcium carbonate obtained from step iv) may be separated from the mother liquor by any conventional means of separation known to the skilled person. According to one embodiment of the present invention, in process step v) the PCC is separated mechanically and/or thermally. Examples for mechanical separation processes are filtration, e.g. by means of a drum filter or filter press, nanofiltration, or centrifugation. An example for a thermal separation process is an up-concentration process by the application of heat, for example, in an evaporator. According to a preferred embodiment, in process step v) the PCC is separated mechanically, preferably by filtration and/or centrifugation.

It is also preferred that the mother liquor obtained after precipitation and/or any one of the reactants may be recycled into the process.

The obtained PCC may be further processed, e.g., may be deagglomerated or subjected to a dry grinding step. Otherwise, it may also be wet ground in form of a suspension. If the PCC is subjected to dewatering, dispersion and/or grinding steps, these steps may be accomplished by procedures known in the art. Wet grinding may be carried out in the absence of a grinding aid or in the presence of a grinding aid. One or more grinding agents can be included, such as, e.g., sodium polyacrylate, a salt of polyacrylate acid, and/or a salt of a copolymer of acrylic acid. Dispersants also can be included to prepare dispersions if desired.

According to still a further aspect of the present invention, the process for producing precipitated calcium carbonate comprising steps i) to v) further comprises a step vi) of drying the separated precipitated calcium carbonate obtained from step v), and optionally a step vii) of contacting at least a part of the surface of the precipitated calcium carbonate with a surface-treatment agent.

According to one embodiment of the present invention, a process for producing dried precipitated calcium carbonate is provided, the process comprising the steps of:
- i) providing a calcium oxide containing material,
- ii) providing a natural ground calcium carbonate (NGCC) as precipitation additive, wherein the natural ground calcium carbonate (NGCC) has a weight median diameter $d_{50}$ of at least 0.3 μm,
- iii) preparing a milk of lime by mixing water, the calcium oxide containing material of step i), and the natural ground calcium carbonate (NGCC) of step ii), wherein the natural ground calcium carbonate (NGCC) is present in an amount ranging from >5 to 25 wt.-%, based on the total weight of the calcium oxide containing material,
- iv) carbonating the milk of lime obtained from step iii) to form an aqueous suspension of precipitated calcium carbonate,
- v) separating the precipitated calcium carbonate from the aqueous suspension obtained from step iv), and
- vi) drying the separated precipitated calcium carbonate obtained from step v).

Optionally, the process for producing dried precipitated calcium carbonate further comprises a step of concentrating the separated precipitated calcium carbonate obtained from step v) before step vi). Suitable concentration methods are known to the skilled person. For example, the desired concentration may be achieved by means of a thermal process, e.g., in an evaporator under ambient, atmospheric pressure or at reduced pressure, or by means of a mechanical process, e.g., in a filter press, such as nanofiltration, and/or centrifuge.

In general, the drying step vi) takes place using any suitable drying equipment and can, for example, include thermal drying and/or drying at reduced pressure using equipment such as an evaporator, a flash drier, an oven, a spray drier and/or drying in a vacuum chamber.

According to one embodiment, drying step vi) is a spray drying step, preferably said spray drying step is carried out at a lower temperature ranging from 200° C. to 400° C., and preferably from 250° C. to 350° C. By means of drying step vi), a dried precipitated calcium carbonate is obtained having a low total moisture content which is less than or equal to 1.0 wt.-%, based on the total weight of the dried precipitated calcium carbonate.

According to another embodiment, the dried precipitated calcium carbonate of step vi) has a total moisture content of less than or equal to 0.5 wt.-% and preferably less than or equal to 0.2 wt.-%, based on the total weight of the dried precipitated calcium carbonate. According to still another embodiment, the dried precipitated calcium carbonate of step vi) has a total moisture content of between 0.20 and 0.70 wt.-%, preferably between 0.25 and 0.60 wt.-%, and more preferably between 0.30 and 0.50 wt.-%, based on the total weight of the dried precipitated calcium carbonate.

The precipitated calcium carbonate obtained by the inventive process can be post-treated, for example, before and/or during and/or after a drying step with a surface-treatment agent. Preferably, the precipitated calcium carbonate obtained by the inventive process is post-treated with a surface-treatment agent before a drying step. According to one embodiment the precipitated calcium carbonate is treated with a fatty acid, e.g. stearic acid, a silane, or phosphoric esters of fatty acids, or a siloxane.

According to one embodiment of the present invention, the process for producing dried precipitated calcium carbonate comprises the steps i) to vi), and further a step vii) of contacting at least a part of the surface of the precipitated calcium carbonate with a surface-treatment agent.

For example, the surface-treatment agent is selected from the group consisting of I) a phosphoric acid ester blend of one or more phosphoric acid mono ester and/or salts thereof and/or one or more phosphoric acid di-ester and/or salts thereof, and/or II) at least one saturated or unsaturated aliphatic linear or branched carboxylic acid and/or salts thereof, preferably at least one aliphatic carboxylic acid having a total amount of carbon atoms from C4 to C24 and/or a salt thereof, more preferably at least one aliphatic carboxylic acid having a total amount of carbon atoms from C12 to C20 and/or a salt thereof, most preferably at least one aliphatic carboxylic acid having a total amount of carbon atoms from C16 to C18 and/or a salt thereof and/or III) at least one mono-substituted succinic anhydride consisting of succinic anhydride mono-substituted with a group selected from a linear, branched, aliphatic and cyclic group having a total amount of carbon atoms from at least C2 to C30 in the substituent and/or salts thereof, and/or IV) at least one polydialkylsiloxane, and/or V) mixtures of one or more materials according to I) to IV).

According to one embodiment of the present invention, the surface-treatment agent is a phosphoric acid ester blend of one or more phosphoric acid mono-ester and/or salts thereof and/or one or more phosphoric acid di-ester and/or salts thereof.

In one embodiment of the present invention, the one or more phosphoric acid mono-ester consists of an o-phosphoric acid molecule esterified with one alcohol selected from saturated, branched or linear, aliphatic or aromatic alcohols having a total amount of carbon atoms from C6 to C30 in the alcohol substituent. For example, the one or more phosphoric acid mono-ester consists of an o-phosphoric acid molecule esterified with one alcohol selected from saturated, branched or linear, aliphatic or aromatic alcohols having a total amount of carbon atoms from C8 to C22, more preferably from C8 to C20 and most preferably from C8 to C18 in the alcohol substituent.

Alkyl esters of phosphoric acid are well known in the industry especially as surfactants, lubricants and antistatic agents (Die Tenside; Kosswig und Stache, Carl Hanser Verlag München, 1993).

The synthesis of alkyl esters of phosphoric acid by different methods and the surface treatment of minerals with alkyl esters of phosphoric acid are well known by the skilled man, e.g. from Pesticide Formulations and Application Systems: 17th Volume; Collins H M, Hall F R, Hopkinson M, STP1268; Published: 1996, U.S. Pat. Nos. 3,897,519 A, 4,921,990 A, 4,350,645 A, 6,710,199 B2, 4,126,650 A, 5,554,781 A, EP1092000 B1 and WO2008/023076 A1.

In one embodiment of the present invention, the one or more phosphoric acid mono-ester consists of an o-phosphoric acid molecule esterified with one alcohol selected from saturated and linear or branched and aliphatic alcohols having a total amount of carbon atoms from $C_6$ to $C_{30}$ in the alcohol substituent. For example, the one or more phosphoric acid mono-ester consists of an o-phosphoric acid molecule esterified with one alcohol selected from saturated and linear or branched and aliphatic alcohols having a total amount of carbon atoms from C8 to C22, more preferably from C8 to C20 and most preferably from C8 to C18 in the alcohol substituent.

In one embodiment of the present invention, the one or more phosphoric acid mono-ester consists of an o-phosphoric acid molecule esterified with one alcohol selected from saturated and linear and aliphatic alcohols having a total amount of carbon atoms from C6 to C30, preferably from C8 to C22, more preferably from C8 to C20 and most preferably from C8 to C18 in the alcohol substituent. Alternatively, the one or more phosphoric acid mono-ester consists of an o-phosphoric acid molecule esterified with one alcohol selected from saturated and branched and aliphatic alcohols having a total amount of carbon atoms from C6 to C30, preferably from C8 to C22, more preferably from C8 to C20 and most preferably from C8 to C18 in the alcohol substituent.

In one embodiment of the present invention, the one or more phosphoric acid mono-ester is selected from the group comprising hexyl phosphoric acid mono-ester, heptyl phosphoric acid mono-ester, octyl phosphoric acid mono-ester, 2-ethylhexyl phosphoric acid mono-ester, nonyl phosphoric acid mono-ester, decyl phosphoric acid mono-ester, undecyl phosphoric acid mono-ester, dodecyl phosphoric acid mono-ester, tetradecyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof.

For example, the one or more phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof. In one embodiment of the present invention, the one or more phosphoric acid mono-ester is 2-octyl-1-dodecylphosphoric acid mono-ester.

It is appreciated that the expression "one or more" phosphoric acid di-ester means that one or more kinds of phosphoric acid di-ester may be present in the treatment layer of the surface-treated material product and/or the phosphoric acid ester blend.

Accordingly, it should be noted that the one or more phosphoric acid di-ester may be one kind of phosphoric acid di-ester. Alternatively, the one or more phosphoric acid di-ester may be a mixture of two or more kinds of phosphoric acid di-ester. For example, the one or more phosphoric acid di-ester may be a mixture of two or three kinds of phosphoric acid di-ester, like two kinds of phosphoric acid di-ester.

In one embodiment of the present invention, the one or more phosphoric acid di-ester consists of an o-phosphoric acid molecule esterified with two alcohols selected from saturated, branched or linear, aliphatic or aromatic alcohols having a total amount of carbon atoms from C6 to C30 in the alcohol substituent. For example, the one or more phosphoric acid di-ester consists of an o-phosphoric acid molecule esterified with two fatty alcohols selected from saturated, branched or linear, aliphatic or aromatic alcohols having a total amount of carbon atoms from C8 to C22, more preferably from C8 to C20 and most preferably from C8 to C18 in the alcohol substituent.

It is appreciated that the two alcohols used for esterifying the phosphoric acid may be independently selected from the same or different saturated, branched or linear, aliphatic or aromatic alcohols having a total amount of carbon atoms from C6 to C30 in the alcohol substituent. In other words, the one or more phosphoric acid di-ester may comprise two substituents being derived from the same alcohols or the phosphoric acid di-ester molecule may comprise two substituents being derived from different alcohols.

In one embodiment of the present invention, the one or more phosphoric acid di-ester consists of an o-phosphoric acid molecule esterified with two alcohols selected from the same or different, saturated and linear or branched and aliphatic alcohols having a total amount of carbon atoms from C6 to C30 in the alcohol substituent. For example, the one or more phosphoric acid di-ester consists of an o-phosphoric acid molecule esterified with two alcohols selected from the same or different, saturated and linear or branched and aliphatic alcohols having a total amount of carbon atoms from C8 to C22, more preferably from C8 to C20 and most preferably from C8 to C18 in the alcohol substituent.

In one embodiment of the present invention, the one or more phosphoric acid di-ester consists of an o-phosphoric acid molecule esterified with two alcohols selected from the same or different, saturated and linear and aliphatic alcohols having a total amount of carbon atoms from C6 to C30, preferably from C8 to C22, more preferably from C8 to C20 and most preferably from C8 to C18 in the alcohol substituent. Alternatively, the one or more phosphoric acid di-ester consists of an o-phosphoric acid molecule esterified with two alcohols selected from the same or different, saturated and branched and aliphatic alcohols having a total amount of carbon atoms from C6 to C30, preferably from C8 to C22, more preferably from C8 to C20 and most preferably from C8 to C18 in the alcohol substituent.

In one embodiment of the present invention, the one or more phosphoric acid di-ester is selected from the group comprising hexyl phosphoric acid di-ester, heptyl phosphoric acid di-ester, octyl phosphoric acid di-ester, 2-ethylhexyl phosphoric acid di-ester, nonyl phosphoric acid di-ester, decyl phosphoric acid di-ester, undecyl phosphoric acid di-ester, dodecyl phosphoric acid di-ester, tetradecyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof.

For example, the one or more phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof. In one embodiment of the present invention, the one or more phosphoric acid di-ester is 2-octyl-1-dodecylphosphoric acid di-ester.

In one embodiment of the present invention, the one or more phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof and the one or more phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof.

According to another embodiment of the present invention, the surface-treatment agent is at least one saturated or unsaturated aliphatic linear or branched carboxylic acid and/or salts thereof preferably at least one aliphatic carboxylic acid having a total amount of carbon atoms from C4 to C24 and/or a salt thereof, more preferably at least one aliphatic carboxylic acid having a total amount of carbon atoms from C12 to C20 and/or a salt thereof, most preferably at least one aliphatic carboxylic acid having a total amount of carbon atoms from C16 to C18 and/or a salt thereof.

The carboxylic acid in the meaning of the present invention may be selected from one or more linear chain, branched chain, saturated, or unsaturated and/or alicyclic carboxylic acids. Preferably, the aliphatic carboxylic acid is a monocarboxylic acid, i.e. the aliphatic carboxylic acid is characterized in that a single carboxyl group is present. Said carboxyl group is placed at the end of the carbon skeleton.

In one embodiment of the present invention, the aliphatic linear or branched carboxylic acid and/or salt thereof is selected from saturated unbranched carboxylic acids, preferably selected from the group of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid, their salts, their anhydrides and mixtures thereof.

In another embodiment of the present invention, the aliphatic linear or branched carboxylic acid and/or salt thereof is selected from the group consisting of octanoic acid, decanoic acid, lauric acid, myristic acid, palmitic acid, stearic acid, arachidic acid and mixtures thereof. Preferably, the aliphatic carboxylic acid is selected from the group consisting of myristic acid, palmitic acid, stearic acid, their salts, their anhydrides and mixtures thereof.

Preferably, the aliphatic carboxylic acid and/or a salt or anhydride thereof is stearic acid and/or a stearic acid salt or stearic anhydride.

Alternatively, the unsaturated aliphatic linear or branched carboxylic acid is preferably selected from the group consisting of myristoleic acid, palmitoleic acid, sapienic acid, oleic acid, elaidic acid, vaccenic acid, linoleic acid, α-linolenic acid, eicosapentaenoic acid, docosahexaenoic acid and mixtures thereof. More preferably, the unsaturated aliphatic linear or branched carboxylic acid selected from the group consisting of myristoleic acid, palmitoleic acid, sapienic acid, oleic acid, elaidic acid, vaccenic acid, linoleic acid, α-linolenic acid and mixtures thereof. Most preferably, the unsaturated aliphatic linear or branched carboxylic acid is oleic acid and/or linoleic acid, preferably oleic acid or linoleic acid, most preferably linoleic acid.

Additionally or alternatively, the surface treatment agent is a salt of an unsaturated aliphatic linear or branched carboxylic acid.

The term "salt of an unsaturated aliphatic linear or branched carboxylic acid" refers to an unsaturated fatty acid, wherein the active acid group is partially or completely neutralized. The term "partially neutralized" unsaturated aliphatic linear or branched carboxylic acid refers to a degree of neutralization of the active acid groups in the range from 40 and 95 mole-% preferably from 50 to 95 mole-%, more preferably from 60 to 95 mole-% and most preferably from 70 to 95 mole-%. The term "completely neutralized" unsaturated aliphatic linear or branched carboxylic acid refers to a degree of neutralization of the active acid groups of >95 mole-%, preferably of >99 mole-%, more preferably of >99.8 mole-% and most preferably of 100 mole-%. Preferably, the active acid groups are partially or completely neutralized.

The salt of unsaturated aliphatic linear or branched carboxylic acid is preferably a compound selected from the group consisting of sodium, potassium, calcium, magnesium, lithium, strontium, primary amine, secondary amine, tertiary amine and/or ammonium salts thereof, whereby the amine salts are linear or cyclic. For example, the unsaturated aliphatic linear or branched carboxylic acid is a salt of oleic acid and/or linoleic acid, preferably oleic acid or linoleic acid, most preferably linoleic acid.

According to another embodiment of the present invention, the surface-treatment agent is at least one mono-substituted succinic anhydride consisting of succinic anhydride mono-substituted with a group selected from a linear, branched, aliphatic and cyclic group having a total amount of carbon atoms from at least C2 to C30 in the substituent and/or salts thereof. Preferably, the surface-treatment agent is at least one mono-substituted succinic anhydride consisting of succinic anhydride mono-substituted with a group being a linear aliphatic group having a total amount of carbon atoms from at least C2 to C30 in the substituent and/or salts thereof. Additionally or alternatively, the surface-treatment agent is at least one mono-substituted succinic anhydride consisting of succinic anhydride mono-substituted with a group being a branched aliphatic group having a total amount of carbon atoms from at least C3 to C30 in the substituent and/or salts thereof. Additionally or alternatively, the surface-treatment agent is at least one mono-substituted succinic anhydride consisting of succinic anhydride mono-substituted with a group being a cyclic aliphatic group having a total amount of carbon atoms from at least C5 to C30 in the substituent and/or salts thereof.

Accordingly, it should be noted that the at least one mono-substituted succinic anhydride may be one kind of mono-substituted succinic anhydride. Alternatively, the at least one mono-substituted succinic anhydride may be a mixture of two or more kinds of mono-substituted succinic anhydride. For example, the at least one mono-substituted succinic anhydride may be a mixture of two or three kinds of mono-substituted succinic anhydride, like two kinds of mono-substituted succinic anhydride.

In one embodiment of the present invention, the at least one mono-substituted succinic anhydride is one kind of mono-substituted succinic anhydride.

It is appreciated that the at least one mono-substituted succinic anhydride consists of succinic anhydride mono-substituted with a group selected from any linear, branched, aliphatic, and cyclic group having a total amount of carbon atoms from C2 to C30 in the substituent.

In one embodiment of the present invention, the at least one mono-substituted succinic anhydride consists of succinic anhydride mono-substituted with a group selected from a linear, branched, aliphatic, and cyclic group having a total amount of carbon atoms from C3 to C20 in the substituent. For example, the at least one mono-substituted succinic anhydride consists of succinic anhydride mono-substituted with a group selected from a linear, branched, aliphatic, and cyclic group having a total amount of carbon atoms from C4 to C18 in the substituent. Preferably, the surface-treatment agent is at least one mono-substituted succinic anhydride consisting of succinic anhydride mono-substituted with a group being a linear aliphatic group having a total amount of carbon atoms from C3 to C20, more preferably from C4 to C18, in the substituent and/or salts thereof. Additionally or alternatively, the surface-treatment agent is at least one mono-substituted succinic anhydride consisting of succinic anhydride mono-substituted with a group being a branched aliphatic group having a total amount of carbon atoms from C3 to C20, more preferably from C4 to C18, in the substituent and/or salts thereof. Additionally or alternatively, the surface-treatment agent is at least one mono-substituted succinic anhydride consisting of succinic anhydride mono-substituted with a group being a cyclic aliphatic group having a total amount of carbon atoms from C5 to C20, more preferably from C5 to C18 in the substituent and/or salts thereof.

In one embodiment of the present invention, the at least one mono-substituted succinic anhydride consists of succinic anhydride mono-substituted with one group being a linear and aliphatic group having a total amount of carbon atoms from C2 to C30, preferably from C3 to C20 and most preferably from C4 to C18 in the substituent. Additionally or alternatively, the at least one mono-substituted succinic anhydride consists of succinic anhydride mono-substituted with one group being a branched and aliphatic group having a total amount of carbon atoms from C3 to C30, preferably from C3 to C20 and most preferably from C4 to C18 in the substituent.

Thus, it is preferred that the at least one mono-substituted succinic anhydride consists of succinic anhydride mono-substituted with one group being a linear alkyl group having a total amount of carbon atoms from C2 to C30, preferably from C3 to C20 and most preferably from C4 to C18 in the substituent. Additionally or alternatively, it is preferred that the at least one mono-substituted succinic anhydride consists of succinic anhydride mono-substituted with one group being a branched alkyl group having a total amount of carbon atoms from C3 to C30, preferably from C3 to C20 and most preferably from C4 to C18 in the substituent.

For example, the at least one mono-substituted succinic anhydride consists of succinic anhydride mono-substituted with one group being a linear alkyl group having a total amount of carbon atoms from C2 to C30, preferably from C3 to C20 and most preferably from C4 to C18 in the substituent. Additionally or alternatively, the at least one mono-substituted succinic anhydride consists of succinic anhydride mono-substituted with one group being a branched alkyl group having a total amount of carbon atoms from C3 to C30, preferably from C3 to C20 and most preferably from C4 to C18 in the substituent.

In one embodiment of the present invention, the at least one mono-substituted succinic anhydride is at least one linear or branched alkyl mono-substituted succinic anhydride. For example, the at least one alkyl mono-substituted succinic anhydride is selected from the group comprising ethylsuccinic anhydride, propylsuccinic anhydride, butylsuccinic anhydride, triisobutyl succinic anhydride, pentylsuccinic anhydride, hexylsuccinic anhydride, heptylsuccinic anhydride, octylsuccinic anhydride, nonylsuccinic anhydride, decyl succinic anhydride, dodecyl succinic anhydride, hexadecanyl succinic anhydride, octadecanyl succinic anhydride, and mixtures thereof.

Accordingly, it is appreciated that, e.g., the term "butylsuccinic anhydride" comprises linear and branched butylsuccinic anhydride(s). One specific example of linear butylsuccinic anhydride(s) is n-butylsuccinic anhydride. Specific examples of branched butylsuccinic anhydride(s) are iso-butylsuccinic anhydride, sec-butylsuccinic anhydride and/or tert-butylsuccinic anhydride.

Furthermore, it is appreciated that, e.g., the term "hexadecanyl succinic anhydride" comprises linear and branched hexadecanyl succinic anhydride(s). One specific example of linear hexadecanyl succinic anhydride(s) is n-hexadecanyl succinic anhydride. Specific examples of branched hexadecanyl succinic anhydride(s) are 14-methylpentadecanyl succinic anhydride, 13-methylpentadecanyl succinic anhydride, 12-methylpentadecanyl succinic anhydride, 11-methylpentadecanyl succinic anhydride, 10-methylpentadecanyl succinic anhydride, 9-methylpentadecanyl succinic anhydride, 8-methylpentadecanyl succinic anhydride, 7-methylpentadecanyl succinic anhydride, 6-methylpentadecanyl succinic anhydride, 5-methylpentadecanyl succinic anhydride, 4-methylpentadecanyl succinic anhydride, 3-methylpentadecanyl succinic anhydride, 2-methylpentadecanyl succinic anhydride, 1-methylpentadecanyl succinic anhydride, 13-ethylbutadecanyl succinic anhydride, 12-ethylbutadecanyl succinic anhydride, 11-ethylbutadecanyl succinic anhydride, 10-ethylbutadecanyl succinic anhydride, 9-ethylbutadecanyl succinic anhydride, 8-ethylbutadecanyl succinic anhydride, 7-ethylbutadecanyl succinic anhydride, 6-ethylbutadecanyl succinic anhydride, 5-ethylbutadecanyl succinic anhydride, 4-ethylbutadecanyl succinic anhydride, 3-ethylbutadecanyl succinic anhydride, 2-ethylbutadecanyl succinic anhydride, 1-ethylbutadecanyl succinic anhydride, 2-butyldodecanyl succinic anhydride, 1-hexyldecanyl succinic anhydride, 1-hexyl-2-decanyl succinic anhydride, 2-hexyldecanyl succinic anhydride, 6,12-dimethylbutadecanyl succinic anhydride, 2,2-diethyldodecanyl succinic anhydride, 4,8,12-trimethyltridecanyl succinic anhydride, 2,2,4,6,8-pentamethylundecanyl succinic anhydride, 2-ethyl-4-methyl-2-(2-methylpentyl)-heptyl succinic anhydride and/or 2-ethyl-4,6-dimethyl-2-propylnonyl succinic anhydride.

Furthermore, it is appreciated that e.g. the term "octadecanyl succinic anhydride" comprises linear and branched octadecanyl succinic anhydride(s). One specific example of linear octadecanyl succinic anhydride(s) is n-octadecanyl succinic anhydride. Specific examples of branched hexadecanyl succinic anhydride(s) are 16-methylheptadecanyl succinic anhydride, 15-methylheptadecanyl succinic anhydride, 14-methylheptadecanyl succinic anhydride, 13-methylheptadecanyl succinic anhydride, 12-methylheptadecanyl succinic anhydride, 11-methylheptadecanyl succinic anhydride, 10-methylheptadecanyl succinic anhydride, 9-methylheptadecanyl succinic anhydride, 8-methylheptadecanyl succinic anhydride, 7-methylheptadecanyl succinic anhydride, 6-methylheptadecanyl succinic anhydride, 5-methylheptadecanyl succinic anhydride, 4-methylheptadecanyl succinic anhydride, 3-methylheptadecanyl succinic anhydride, 2-methylheptadecanyl succinic anhydride, 1-methylheptadecanyl succinic anhydride, 14-ethylhexadecanyl succinic anhydride, 13-ethylhexadecanyl succinic anhydride, 12-ethylhexadecanyl succinic anhydride, 11-ethylhexadecanyl succinic anhydride, 10-ethylhexadecanyl succinic anhydride, 9-ethylhexadecanyl succinic anhydride, 8-ethylhexadecanyl succinic anhydride, 7-ethylhexadecanyl succinic anhydride, 6-ethylhexadecanyl succinic anhydride, 5-ethylhexadecanyl succinic anhydride, 4-ethylhexadecanyl succinic anhydride, 3-ethylhexadecanyl succinic anhydride, 2-ethylhexadecanyl succinic anhydride, 1-ethylhexadecanyl succinic anhydride, 2-hexyldodecanyl succinic anhydride, 2-heptylundecanyl succinic anhydride, iso-octadecanyl succinic anhydride and/or 1-octyl-2-decanyl succinic anhydride.

In one embodiment of the present invention, the at least one alkyl mono-substituted succinic anhydride is selected from the group comprising butylsuccinic anhydride, hexylsuccinic anhydride, heptylsuccinic anhydride, octylsuccinic anhydride, hexadecanyl succinic anhydride, octadecanyl succinic anhydride, and mixtures thereof.

In one embodiment of the present invention, the at least one mono-substituted succinic anhydride is one kind of alkyl mono-substituted succinic anhydride. For example, the one alkyl mono-substituted succinic anhydride is butylsuccinic anhydride. Alternatively, the one alkyl mono-substituted succinic anhydride is hexylsuccinic anhydride. Alternatively, the one alkyl mono-substituted succinic anhydride is heptylsuccinic anhydride or octylsuccinic anhydride. Alternatively, the one alkyl mono-substituted succinic anhydride is hexadecanyl succinic anhydride. For example, the one alkyl mono-substituted succinic anhydride is linear hexadecanyl succinic anhydride such as n-hexadecanyl succinic anhydride or branched hexadecanyl succinic anhydride such as 1-hexyl-2-decanyl succinic anhydride. Alternatively, the one alkyl mono-substituted succinic anhydride is octadecanyl succinic anhydride. For example, the one alkyl mono-substituted succinic anhydride is linear octadecanyl succinic anhydride such as n-octadecanyl succinic anhydride or branched octadecanyl succinic anhydride such as iso-octadecanyl succinic anhydride or 1-octyl-2-decanyl succinic anhydride.

In one embodiment of the present invention, the one alkyl mono-substituted succinic anhydride is butylsuccinic anhydride such as n-butylsuccinic anhydride.

In one embodiment of the present invention, the at least one mono-substituted succinic anhydride is a mixture of two or more kinds of alkyl mono-substituted succinic anhydrides. For example, the at least one mono-substituted succinic anhydride is a mixture of two or three kinds of alkyl mono-substituted succinic anhydrides.

According to another embodiment of the present invention, the surface-treatment agent is at least one polydialkylsiloxane.

Preferred polydialkylsiloxanes are described e.g. in US20040097616 A1. Most preferred are polydialkylsiloxanes selected from the group consisting of polydimethylsiloxane, preferably dimethicone, polydiethylsiloxane and polymethylphenylsiloxane and/or mixtures thereof.

For example, the at least one polydialkylsiloxane is preferably a polydimethylsiloxane (PDMS).

Products and their Uses

According to the present invention, an aqueous suspension of precipitated calcium carbonate is provided, which is obtainable by a process comprising the steps of:

i) providing a calcium oxide containing material, ii) providing a natural ground calcium carbonate (NGCC) as precipitation additive, wherein the natural ground calcium carbonate (NGCC) has a weight median diameter $d_{50}$ of at least 0.3 μm, iii) preparing a milk of lime by mixing water, the calcium oxide containing material of step i), and the natural ground calcium carbonate (NGCC) of step ii), wherein the natural ground calcium carbonate (NGCC) is present in an amount ranging from >5 to 25 wt.-%, based on the total weight of the calcium oxide containing material, and iv) carbonating the milk of lime obtained from step iii) to form an aqueous suspension of precipitated calcium carbonate.

According to a further aspect of the present invention, a precipitated calcium carbonate is provided, which is obtainable by a process comprising the steps of:

i) providing a calcium oxide containing material, ii) providing a natural ground calcium carbonate (NGCC) as precipitation additive, wherein the natural ground calcium carbonate (NGCC) has a weight median diameter $d_{50}$ of at least 0.3 μm, iii) preparing a milk of lime by mixing water, the calcium oxide containing material of step i), and the natural ground calcium carbonate (NGCC) of step ii), wherein the natural ground calcium carbonate (NGCC) is present in an amount ranging from >5 to 25 wt.-%, based on the total weight of the calcium oxide containing material, iv) carbonating the milk of lime obtained from step iii) to form an aqueous suspension of precipitated calcium carbonate, and v) separating the precipitated calcium carbonate from the aqueous suspension obtained from step iv).

According to another aspect of the present invention, a dried precipitated calcium carbonate is provided, which is obtainable by a process comprising the steps of i) providing a calcium oxide containing material, ii) providing a natural ground calcium carbonate (NGCC) as precipitation additive, wherein the natural ground calcium carbonate (NGCC) has a weight median diameter $d_{50}$ of at least 0.3 µm, iii) preparing a milk of lime by mixing water, the calcium oxide containing material of step i), and the natural ground calcium carbonate (NGCC) of step ii), wherein the natural ground calcium carbonate (NGCC) is present in an amount ranging from >5 to 25 wt.-%, based on the total weight of the calcium oxide containing material, iv) carbonating the milk of lime obtained from step iii) to form an aqueous suspension of precipitated calcium carbonate, v) separating the precipitated calcium carbonate from the aqueous suspension obtained from step iv), and vi) drying the separated precipitated calcium carbonate obtained from step v).

Optionally, the dried precipitated calcium carbonate may comprise a treatment layer on at least a part of the surface of the precipitated calcium carbonate. According to one embodiment, a dried precipitated calcium carbonate is provided, which is obtainable by a process comprising the steps i) to vi) and further a step vii) of contacting at least a part of the surface of the precipitated calcium carbonate with a surface-treatment agent.

The PCC suspension and/or PCC obtained by the process of the present invention may be used in various materials. According to one embodiment of the present invention, the precipitated calcium carbonate according to the present invention is used in paper, plastics, polymer compositions, paint, coatings, concrete, cosmetics, pharmaceutics and/or agriculture applications. Preferably, a dried precipitated calcium carbonate is used in plastics and/or polymer compositions. According to another embodiment of the present invention, the aqueous suspension of precipitated calcium carbonate according to the present invention is used in paper, plastics, polymer compositions, paint, coatings, concrete, cosmetics, pharmaceutics and/or agriculture applications.

According to one aspect of the present invention, a product comprising the precipitated calcium carbonate according to the present invention is provided. According to a preferred embodiment, the product is a paper, a paper product, an ink, a paint, a coating, a plastic, a polymer composition, an adhesive, a building product, a foodstuff, an agricultural product, a cosmetic product or a pharmaceutical product, and more preferably the product is a plastic or a polymer composition.

According to a preferred embodiment, the dried precipitated calcium carbonate obtainable from process steps i) to vi) is a dried powder of precipitated calcium carbonate.

The dried PCC obtainable from process steps i) to vi) may be used in paper, plastics, polymer compositions, paint, coatings, concrete, cosmetics, pharmaceutics and/or agriculture applications. According to a preferred embodiment, the dried precipitated calcium carbonate is used in plastics and/or polymer compositions. For example, said PCC may be used in thermoplastic polymers, such as polyvinyl chloride, polyolefins, and polystyrene. Moreover, the dried PCC may also be used in polymer coatings which may be applied on the surface of polymer articles, such as foils, in order to increase the hydrophobicity (e.g., reflected by an increased contact angle measured against water) of said surface.

According to one aspect of the present invention, a product comprising dried precipitated calcium carbonate according to the present invention, preferably a dried powder of said precipitated calcium carbonate, is provided. According to one embodiment, the product is a paper, a paper product, an ink, a paint, a coating, a plastic, a polymer composition, an adhesive, a building product, a foodstuff, an agricultural product, a cosmetic product or a pharmaceutical product. According to a preferred embodiment, a product comprising a dried precipitated calcium carbonate is a plastic or a polymer composition.

In view of the favourable results obtained for the present invention, another aspect refers to the use of natural ground calcium carbonate (NGCC) in a process for producing an aqueous suspension of precipitated calcium carbonate, wherein the natural ground calcium carbonate (NGCC) has a weight median diameter $d_{50}$ of at least 0.3 µm.

BRIEF DESCRIPTION OF THE FIGURES

FIG. 2 shows the SEM result for the precipitated calcium carbonate of inventive example 2.

Figure 1:
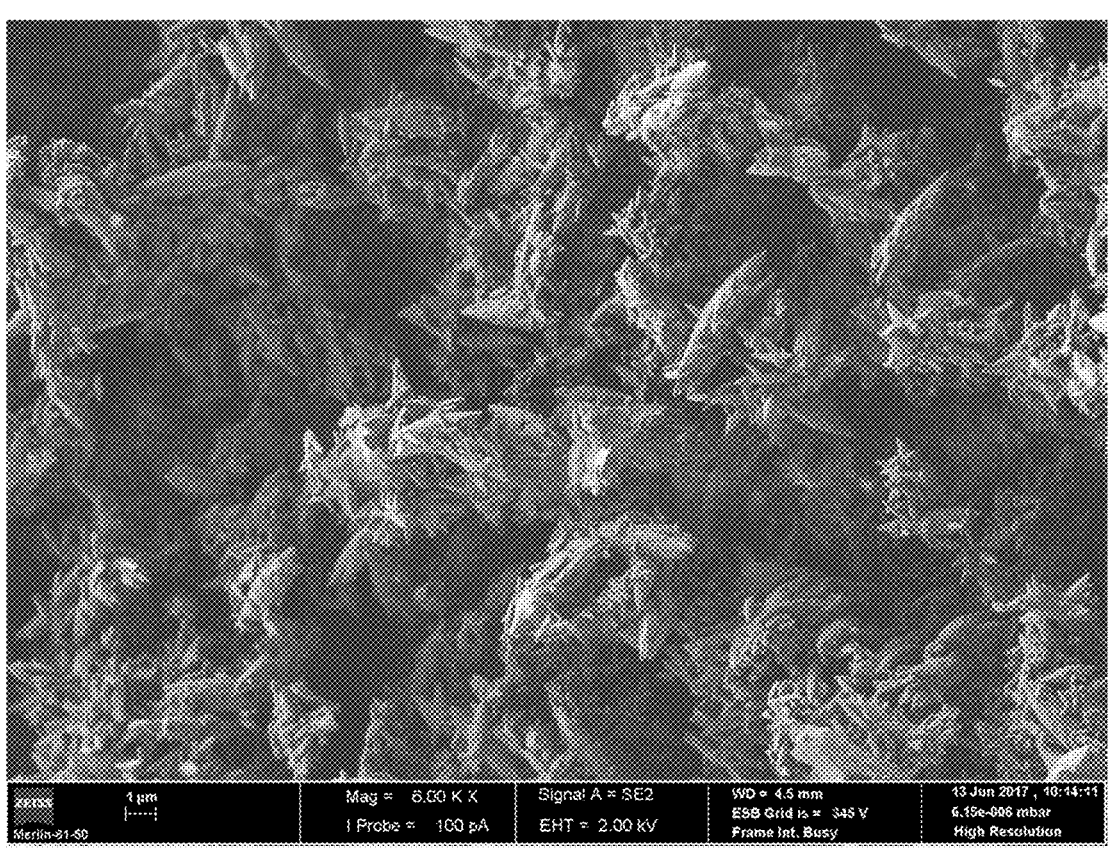
FIG. 1 shows the SEM result for the precipitated calcium carbonate of comparative example 1.

The scope and interest of the invention will be better understood based on the following examples which are intended to illustrate certain embodiments of the present invention and are non-limitative.

EXAMPLES

1. Measurement Methods

In the following, measurement methods implemented in the examples are described.

Particle Size Distribution

The weight median diameter $d_{50}(wt)$ and weight top cut particle size $d_{98}(wt)$ is determined by the sedimentation method, which is an analysis of sedimentation behaviour in a gravimetric field. The measurement is made with a Sedigraph™ 5120, Micromeritics Instrument Corporation. The method and the instrument are known to the skilled person and are commonly used to determine the particle size of fillers and pigments. The measurement is carried out in an aqueous solution of 0.1 wt.-% $Na_4P_2O_7$. The samples were dispersed using a high speed stirrer and sonicated.

The processes and instruments are known to the skilled person and are commonly used to determine the particle size of fillers and pigments.

BET Specific Surface Area (SSA)

The specific surface area was measured via the BET method according to ISO 9277:2010 using nitrogen as adsorbing gas on a Micromeritics ASAP 2460 instrument from Micromeritics. The samples were pretreated in vacuum ($10^{-5}$ bar) by heating at 300° C. for a period of 30 min prior to measurement.

Solids Content of an Aqueous Suspension

The suspension solids content (also known as "dry weight") was determined using a HR73 from Mettler-Toledo (T=120° C., automatic switch off 3, standard drying) with a sample size of 5 to 20 g.

Scanning Electron Microscope (SEM)

A doubled-sided conductive adhesive tape was mounted on a SEM stub. 50 mg of dry sample was applied on the adhesive tape. The investigation under the FESEM (Zeiss Sigma VP) was done at 2 kV. Subsequently, the prepared samples were examined by using a Sigma VP field emission scanning electron microscope (Carl Zeiss AG, Germany) and a secondary electron detector (SE2) at high vacuum ($<10^{-2}$ Pa).

Brookfield Viscosity

The Brookfield viscosity is measured by a Brookfield (type RVT) viscometer at 23° C.±1° C. at 100 rpm after 30 seconds using an appropriate spindle and is specified in mPa·s.

d/d

The term "d/d" refers to the dry amount based on the dry amount of the solid material.

pH of an Aqueous Suspension

The pH of the aqueous suspension is measured using a standard pH-meter at approximately 22° C.

Brightness and Whiteness R457

Whiteness R457 was determined according to norm TAPPI T452/ISO 247. Brightness was measured using an ELREPHO 3000 from the company Datacolor according to ISO 2469:1994 (DIN 53145-2:2000 and DIN 53146:2000)

Conductivity

Conductivity was measured in the slurry sample at 23° C. using a WTW 3110 conductivity meter equipped with a TetraCon 325 probe.

2. Examples

A) Preparation of Natural Ground Calcium Carbonate (NGCC)

A slurry of marble having a $d_{50}$ of 15 μm and a $d_{98}$ of 50 μm was prepared at lab-scale, using only water and marble, without dispersant or any other additive. The solids content of the slurry was 40 wt.-%, based on the total weight of the slurry. Then, the slurry was ground in a 3 L laboratory sandmill using the grinding media Kings Kaolin 0.8-1.0 mm. Multiple grinding batches were made to achieve the necessary quantity of GCC for each carbonation test. Table 1 shows the grinding conditions for the slurry of marble.

TABLE 1

| Milling conditions | |
|---|---|
| Slurry solids content [wt.-%] | 40 |
| Density of the slurry [g/cm³] | 1.34 |
| Total Slurry [cm³] | 656 |
| Beads mass [g] | 2300 |
| Stirrer velocity [rpm] | 970 |
| Grind Time [min] | 6 |

The slurry of marble obtained had the characteristics as set out in the following Table 2.

TABLE 2

| Characteristics of the slurry of marble | |
|---|---|
| Sedigraph | |
| $d_{50}$ [μm] | 1.49 |
| $d_{98}$ [μm] | 6 |
| <20 μm [%] | 100 |
| <10 μm [%] | 99 |
| <5 μm [%] | 97 |
| <2 μm [%] | 66 |
| <1 μm [%] | 31 |
| <0.8 μm [%] | 23 |
| pH | 8.17 |
| Viscosity 100 rpm [mPa · s] | 204 |
| Conductivity [μS/cm] | 321 |
| Solids content [wt.-%] | 41.2 |
| Brightness | |
| R457 | 95.4 |
| L | 98.5 |
| a | 0.11 |
| b | 0.64 |
| y | 1.28 |
| BET [m²/g] | 3.92 |

B) Preparation of an Aqueous Suspension of Precipitated Calcium Carbonate (Comparative Example 1—CE1)

A milk of lime was prepared by using lime from Lusical (Portugal) and water with a lime to water ratio of 1:8.5. Sodium citrate was used in an amount of 0.1 wt.-% based on lime.

Carbonation was carried out in a 10 liter laboratory reactor, equipped with a stirrer rotating at 750 rpm. Gas was 20% $CO_2$ and 80% $N_2$—Aligal 12 from Air Liquid, used at a flowrate of 15 l/min. The carbonation was started at 50° C. and $CO_2$ injection was made until conductivity reached a minimum value, plus 10 minutes. FIG. 1 shows the SEM result of the precipitated calcium carbonate obtained. The precipitated calcium carbonate obtained had the characteristics as set out in Table 3.

C) Preparation of an Aqueous Suspension of Precipitated Calcium Carbonate (Inventive Example 1—IE1)

A milk of lime was prepared by using lime from Lusical (Portugal) and water with a lime to water ratio of 1:8.5. Sodium citrate was used in an amount of 0.1 wt.-% based on lime.

Figure 2:
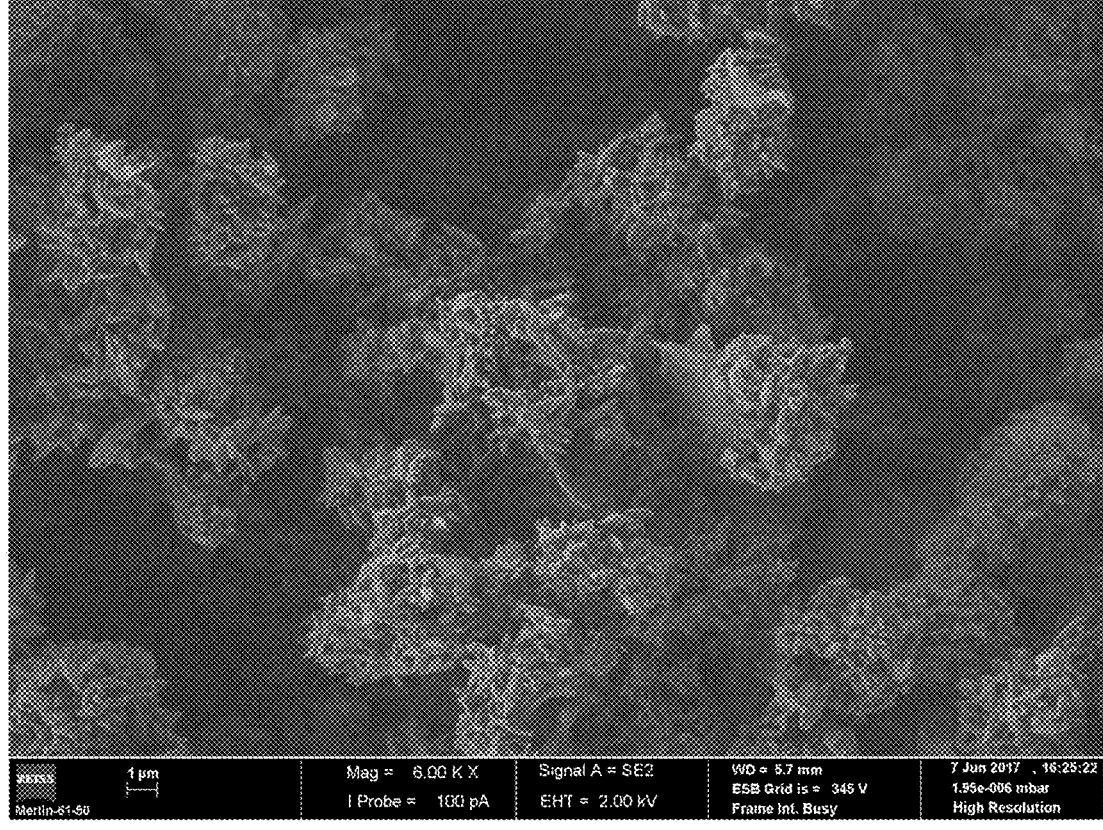
FIG. 2 shows the SEM result for the precipitated calcium carbonate of inventive example 1.

Carbonation was carried out in a 10 liter laboratory reactor, equipped with a stirrer rotating at 750 rpm. Gas was 20% $CO_2$ and 80% $N_2$— Aligal 12 from Air Liquid, used at a flowrate of 15 l/min. The carbonation was started at 50° C. and $CO_2$ injection was made until conductivity reached a minimum value, plus 10 minutes. At the beginning of the carbonation, 10.6 wt.-% of the natural ground calcium carbonate (NGCC), based on the final total weight of calcium carbonate, (d/d) as obtained under A) in form of a slurry was added to the milk of lime. FIG. 2 shows the SEM result of the precipitated calcium carbonate obtained. The precipitated calcium carbonate obtained had the characteristics as set out in Table 3.

D) Preparation of an Aqueous Suspension of Precipitated Calcium Carbonate (Inventive Example 2—IE2)

A milk of lime was prepared by using lime from Lusical (Portugal) and water with a lime to water ratio of 1:8.5. Sodium citrate was used in an amount of 0.1 wt.-% based on lime.

Figure 3:
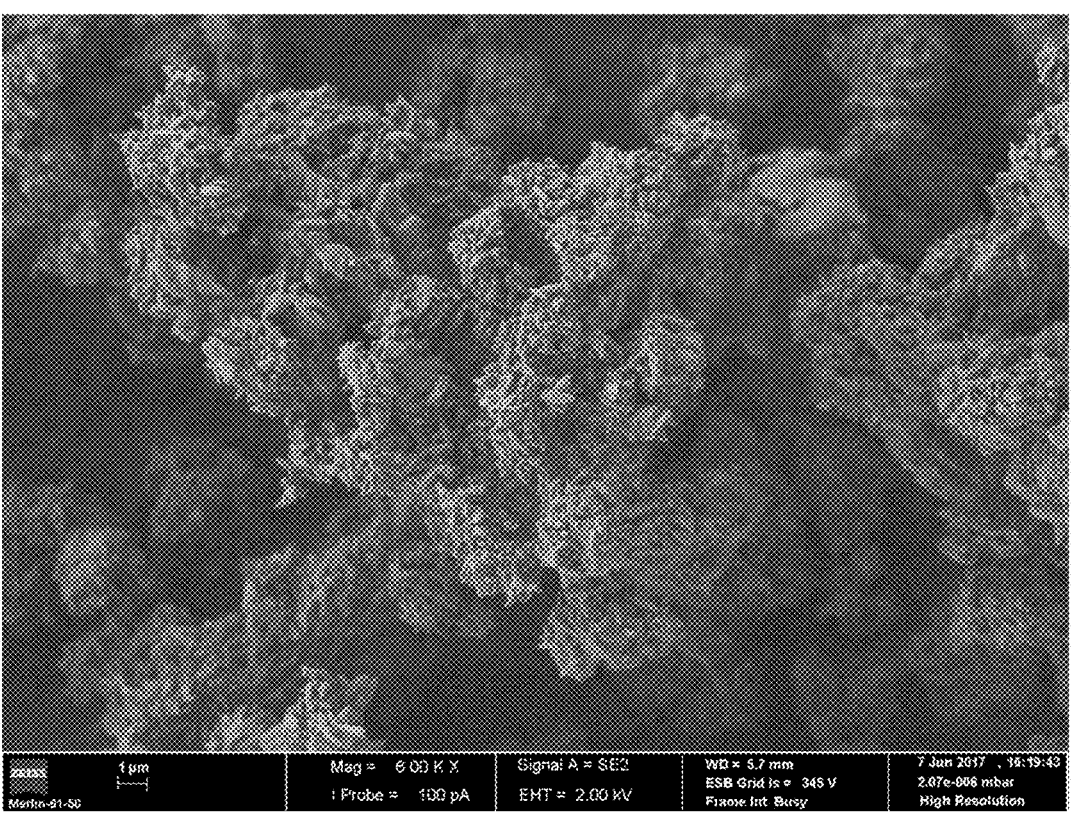

Carbonation was carried out in a 10 liter laboratory reactor, equipped with a stirrer rotating at 750 rpm. Gas was 20% $CO_2$ and 80% $N_2$— Aligal 12 from Air Liquid, used at a flowrate of 15 I/min. The carbonation was started at 50° C. and $CO_2$ injection was made until conductivity reached a minimum value, plus 10 minutes. At the beginning of the carbonation, 19.5 wt.-% of the natural ground calcium carbonate (NGCC), based on the final total weight of calcium carbonate, (d/d) as obtained under A) in form of a slurry was added to the milk of lime. FIG. 3 shows the SEM result of the precipitated calcium carbonate obtained. The precipitated calcium carbonate obtained had the characteristics as set out in Table 3.

E) Preparation of an Aqueous Suspension of Precipitated Calcium Carbonate (Comparative Example 2—CE2)

A milk of lime was prepared by using lime from Lusical (Portugal) and water with a lime to water ratio of 1:8.5. Sodium citrate was used in an amount of 0.1 wt.-% based on lime.

Figure 4:
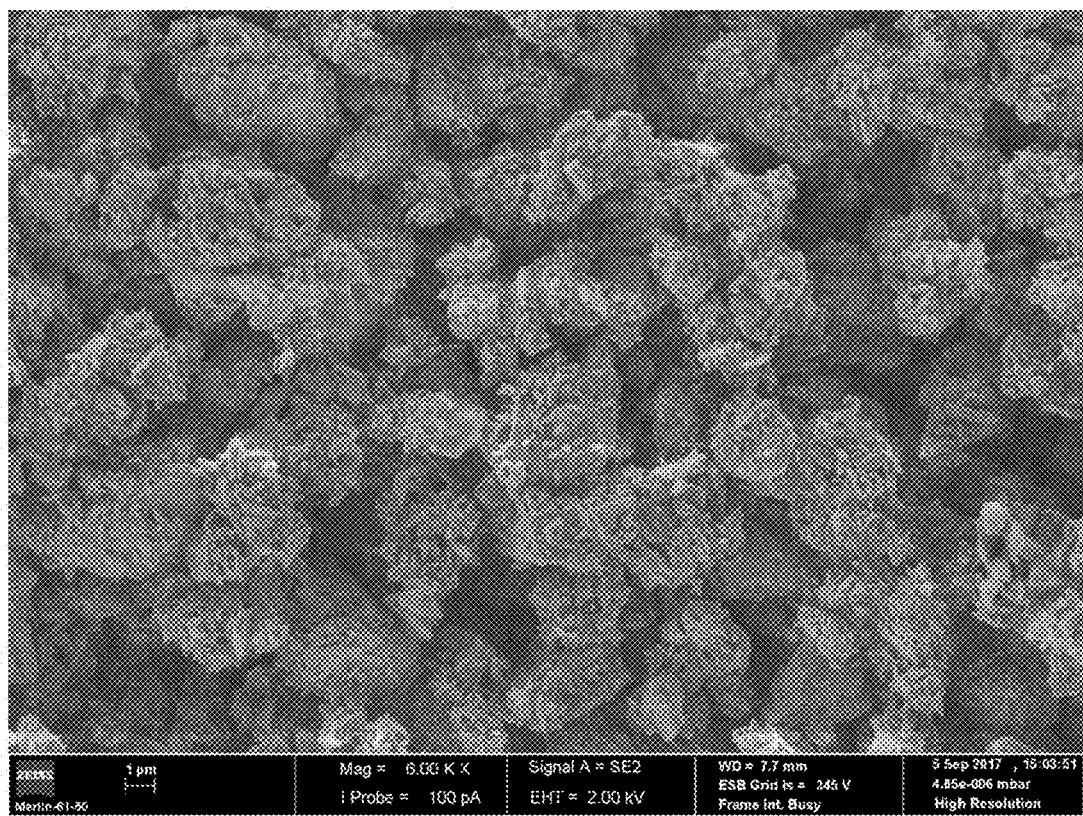
FIG. 4 shows the SEM result for the precipitated calcium carbonate of comparative example 2.

Carbonation was carried out in a 10 liter laboratory reactor, equipped with a stirrer rotating at 750 rpm. Gas was 20% $CO_2$ and 80% $N_2$—Aligal 12 from Air Liquid, used at a flowrate of 15 I/min. The carbonation was started at 50° C. and $CO_2$ injection was made until conductivity reached a minimum value, plus 10 minutes. At the beginning of the carbonation, 31.4 wt.-% of the natural ground calcium carbonate (NGCC), based on the final total weight of calcium carbonate, (d/d) as obtained under A) in form of a slurry was added to the milk of lime. FIG. 4 shows the SEM result of the precipitated calcium carbonate obtained. The precipitated calcium carbonate obtained had the characteristics as set out in Table 3.

F) Preparation of an Aqueous Suspension of Precipitated Calcium Carbonate (Comparative Example 3—CE3)

Figure 5:
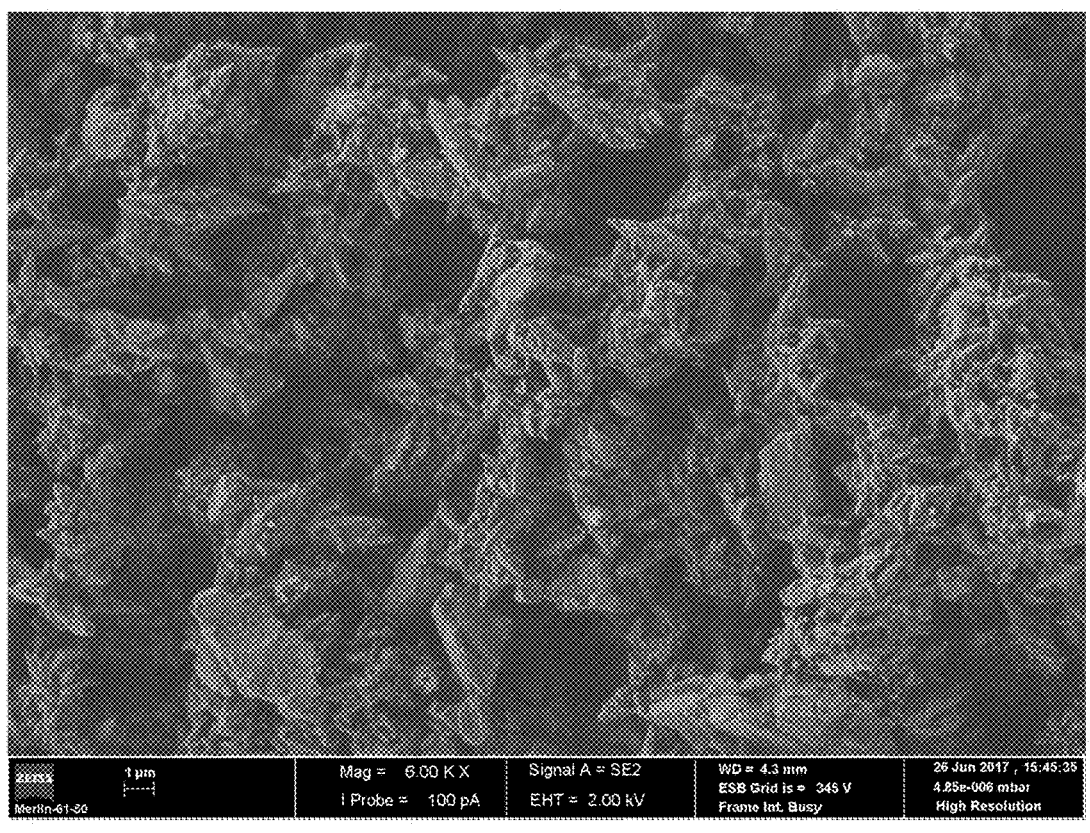
FIG. 5 shows the SEM result for the precipitated calcium carbonate of comparative example 3.

The precipitated calcium carbonate as obtained under A) was simply mixed with the natural ground calcium carbonate (NGCC) (d/d) in form of a slurry as obtained under A) in a weight ratio of about 4:1. FIG. 5 shows the SEM result of the precipitated calcium carbonate obtained. The precipitated calcium carbonate obtained had the characteristics as set out in Table 3.

TABLE 3

Characteristics of the precipitated calcium carbonates obtained in CE1, IE1, IE2 and CE2

|  | CE1 | IE1 | IE2 | CE2 | CE3 |
|---|---|---|---|---|---|
| GCC added [wt.-%] | 0 | 10.6 | 19.5 | 31.4 | 20.3 |
| Time of addition [min] | — | 0 | 0 | 0 | 100 |
| Viscosity [mPa · s] | 23 | 20.8 | 20.4 | 19.6 | 26.4 |
| Sedigraph |  |  |  |  |  |
| $d_{50}$ [mm] | 2.9 | 3.0 | 3.2 | 3.1 | 2.6 |
| $d_{98}$ [mm] | 7 | 6 | 6 | 6 | 6 |
| <2 μm [%] | 17.3 | 12.8 | 8.9 | 5.9 | 28.5 |
| $d_{75}/d_{25}$ | 1.62 | 1.51 | 1.45 | 1.42 | 1.79 |

TABLE 3-continued

Characteristics of the precipitated calcium carbonates obtained in CE1, IE1, IE2 and CE2

|  | CE1 | IE1 | IE2 | CE2 | CE3 |
|---|---|---|---|---|---|
| Brightness |  |  |  |  |  |
| R457 | 97.2 | 96.7 | 95.6 | 95.4 | 96.8 |
| L | 99.2 | 99.1 | 98.7 | 98.6 | 99.1 |
| a | 0.12 | 0.15 | 0.19 | 0.15 | 0.11 |
| b | 0.50 | 0.69 | 0.78 | 0.81 | 0.55 |
| y | 1.02 | 1.39 | 1.6 | 1.63 | 1.11 |
| BET [m²/g] | 3.96 | 4.31 | 4.01 | 3.0 | 4.75 |
| Solids content [wt.-%] | 17.1 | 17.0 | 17.8 | 18.1 | 20.1 |
| pH | 8.2 | 8.0 | 7.9 | 7.8 | 7.8 |

From Table 3, it can be gathered that the precipitated calcium carbonate of inventive examples 1 and 2 have comparable characteristics in terms of $d_{50}$, $d_{98}$, BET specific surface area as well as brightness compared to the precipitated calcium carbonate of comparative example 1, even though a part of lime has been replaced by natural ground calcium carbonate (NGCC) during the production of the precipitated calcium carbonate. Contrary thereto, the mixture of precipitated calcium carbonate and natural ground calcium carbonate (NGCC) (comparative example 3) provides different characteristics especially in terms of the BET specific surface area and particles of <2 μm. It is to be noted that the precipitated calcium carbonate of comparative example 2 shows similar characteristics compared to the precipitated calcium carbonates of inventive examples 1 and 2. However, from the SEM result of the precipitated calcium carbonate of comparative example 2 (FIG. 4), it can be gathered that the morphology obtained for the different precipitated calcium carbonates is different. In particular, the precipitated calcium carbonates of inventive examples 1 and 2 (FIGS. 2 and 3) show a clustered scalenohedral crystal structure, wherein the NGCC particles cover the precipitated calcium carbonate particles and are worn out from the precipitated calcium carbonate particles.

G) Preparation of Natural Ground Calcium Carbonate (NGCC)

A slurry comprising marble from PTOU plant was ground in wet at solids content of about 11 wt.-%, based on the total weight of the slurry, without any additives. The final solids content of the slurry was 11%. Table 4 shows the weight median diameter $d_{50}$ and top cut $d_{98}$ of the NGCC.

TABLE 4

PSD of the NGCC

|  | $d_{50}$ | $d_{98}$ |
|---|---|---|
| NGCC | 0.17 | 0.25 |

H) Preparation of an Aqueous Suspension of Precipitated Calcium Carbonate (Comparative Example 4—CE4)

A milk of lime was prepared by mixing under mechanical stirring 5 liters water with 1000 g calcium oxide (quicklime raw material from Lusical, Portugal) at an initial temperature of 40° C. The obtained mixture was stirred for 30 min, wherein additional 4 liters of water were added. Subsequently, the mixture was sieved through a 100 μm screen.

Figure 6:
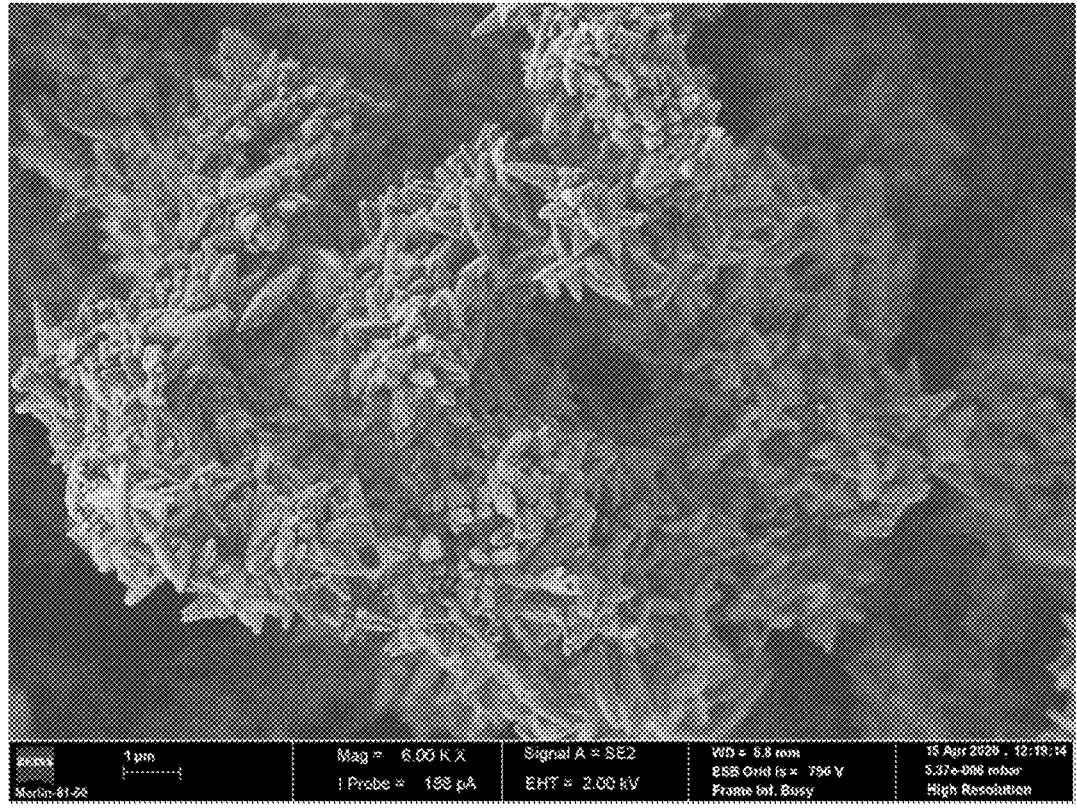
FIG. 6 shows the SEM result for the precipitated calcium carbonate of comparative example 4.

Carbonation trials were made in a 10 liter laboratory reactor. The reactor was equipped with a stirrer that was rotating at 1500 rpm. Lime was from Lusical (Portugal). Sodium citrate was used at 0.1% of the lime. Gas was 20% $CO_2$ and 80% $N_2$— Aligal 12 from Air Liquid, used at a flowrate of 15 I/min. The carbonation started at 50° C. and $CO_2$ injection was made until conductivity reached a minimum value, plus 10 minutes. At the beginning of the carbonation, 5 wt.-% of the natural ground calcium carbonate (NGCC) (d/d) as obtained under G) was added to the milk of lime. FIG. 6 shows the SEM result of the precipitated calcium carbonate obtained. The precipitated calcium carbonate obtained had the characteristics as set out in Table 5.

I) Preparation of an Aqueous Suspension of Precipitated Calcium Carbonate (Comparative Example 5—CE5)

A milk of lime was prepared by mixing under mechanical stirring 5 liters water with 1000 g calcium oxide (quicklime raw material from Lusical, Portugal) at an initial temperature of 40° C. The obtained mixture was stirred for 30 min, wherein additional 4 liters of water were added. Subsequently, the mixture was sieved through a 100 μm screen.

Figure 7:
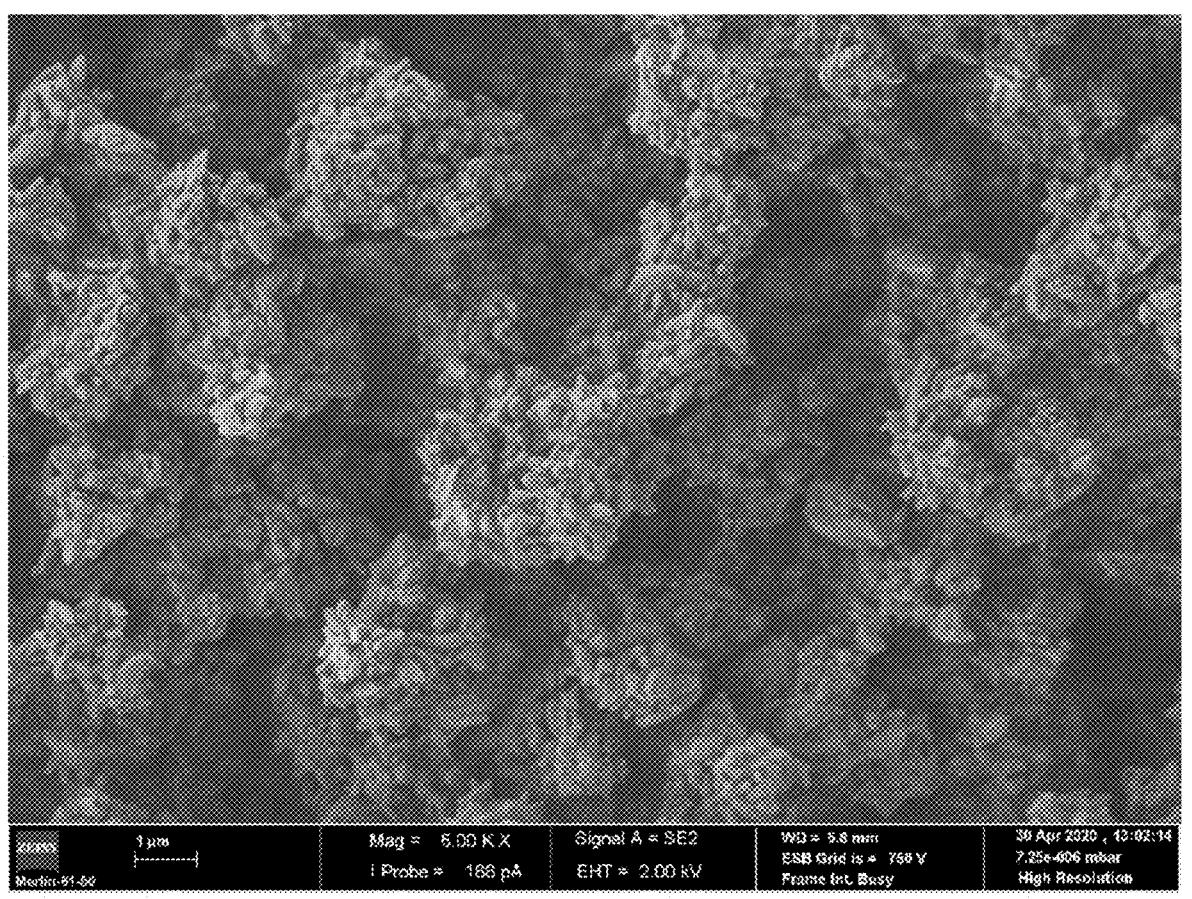
FIG. 7 shows the SEM result for the precipitated calcium carbonate of comparative example 5.

Carbonation trials were made in a 10 liter laboratory reactor. The reactor was equipped with a stirrer that was rotating at 1400 rpm. Lime was from Lusical (Portugal). Sodium citrate was used at 0.1% of the lime. Gas was 20% $CO_2$ and 80% $N_2$— Aligal 12 from Air Liquid, used at a flowrate of 15 I/min. The carbonation started at 50° C. and $CO_2$ injection was made until conductivity reached a minimum value, plus 10 minutes. At the beginning of the carbonation, 19.9 wt.-% of the natural ground calcium carbonate (NGCC) (d/d) as obtained under G) was added to the milk of lime. FIG. 7 shows the SEM result of the precipitated calcium carbonate obtained. The precipitated calcium carbonate obtained had the characteristics as set out in Table 5.

TABLE 5

| Characteristics of IE1, IE2, CE4 and CE5 | | | | |
|---|---|---|---|---|
|  | IE1 | IE2 | CE4 | CE5 |
| GCC added [wt.-%] | 10.6 | 19.5 | 5 | 19.9 |
| Time of addition [min] | 0 | 0 | 0 | 0 |
| Viscosity [mPa · s] | 20.8 | 20.4 | 24.4 | 26.8 |
| Sedigraph | | | | |
| $d_{50}$ [mm] | 3.0 | 3.2 | 2.8 | 1.9 |
| $d_{98}$ [mm] | 6 | 6 | 5 | 4 |
| <2 μm [%] | 12.8 | 8.9 | 11.2 | 54.9 |
| $d_{75}/d_{25}$ | 1.51 | 1.45 | 1.38 | 1.38 |
| Brightness | | | | |
| R457 | 96.7 | 95.6 | 97.3 | 97.3 |
| L | 99.1 | 98.7 | 99.2 | 99.2 |
| a | 0.15 | 0.19 | 0.14 | 0.13 |
| b | 0.69 | 0.78 | 0.55 | 0.48 |
| y | 1.39 | 1.6 | 1.13 | 0.99 |
| BET [m²/g] | 4.31 | 4.01 | 3.9 | 5.2 |
| Solids content [wt.-%] | 17.0 | 17.8 | 16.0 | 15.9 |
| pH | 8.0 | 7.9 | 8.15 | 8.05 |

From Table 5, it can be gathered that the precipitated calcium carbonates of inventive examples 1 and 2 have similar characteristics in terms of $d_{50}$, $d_{98}$, BET specific surface area as well as brightness compared to the precipitated calcium carbonate of comparative examples 4 and 5. However, from the SEM results of the precipitated calcium carbonates of comparative examples 4 and (FIGS. 6 and 7), it can be gathered that the morphology obtained for these precipitated calcium carbonates differs from that of the precipitated calcium carbonates of inventive examples 1 and 2 (FIGS. 2 and 3).

The invention claimed is:

1. A process for producing an aqueous suspension of precipitated calcium carbonate, the process comprising the steps of:
   i) providing a calcium oxide containing material,
   ii) providing a natural ground calcium carbonate (NGCC) as precipitation additive, wherein the natural ground calcium carbonate (NGCC) has a weight median diameter $d_{50}$ of at least 0.3 μm,
   iii) preparing a milk of lime by mixing water, the calcium oxide containing material of step i), and the natural ground calcium carbonate (NGCC) of step ii), wherein the natural ground calcium carbonate (NGCC) is present in an amount ranging from >5 to 25 wt.-%, based on the total weight of the calcium oxide containing material,
   iv) carbonating the milk of lime obtained from step iii) to form an aqueous suspension of precipitated calcium carbonate.

2. The process according to claim 1, wherein step iii) comprises the steps of:
   a1) mixing the calcium oxide containing material of step i) with water, and
   a2) adding the natural ground calcium carbonate (NGCC) of step ii) to the mixture of step a1).

3. The process according to claim 1, wherein step iii) comprises the steps of:
   a1) mixing the natural ground calcium carbonate (NGCC) of step ii) with water, and
   a2) adding the calcium oxide containing material of step i) to the mixture of step a1).

4. The process according to claim 1, wherein the natural ground calcium carbonate (NGCC)
   a) is selected from marble, limestone, chalk and mixtures thereof, and/or
   b) has a content of calcium carbonate of >90 wt.-%, based on the total weight of the natural ground calcium carbonate (NGCC), and/or
   c) has a weight median diameter $d_{50}$ in the range from 0.3 to 10 μm.

5. The process according to claim 1, wherein a slaking additive is added before, during or after step iii).

6. The process according to claim 5, wherein the slaking additive is added in an amount of ≤2 wt. %, based on the total amount of calcium oxide containing material.

7. The process according to claim 1, wherein the obtained suspension of precipitated calcium carbonate has a solids content of at least 5 wt. %, based on the total weight of the suspension.

8. The process according to claim 1, wherein the milk of lime is screened after step iii) and before step iv).

9. A process for producing precipitated calcium carbonate comprising the steps i) to iv) of the process according to claim 1, and further a step v) of separating the precipitated calcium carbonate from the aqueous suspension obtained from step iv).

10. The process according to claim 9, wherein the process further comprises a step vi) of drying the separated precipitated calcium carbonate obtained from step v), and optionally a step vii) of contacting at least a part of the surface of the precipitated calcium carbonate with a surface-treatment agent.

11. The process according to claim 1, wherein the natural ground calcium carbonate (NGCC) has a content of calcium carbonate of ≥92 wt.-%, based on the total weight of the natural ground calcium carbonate (NGCC).

12. The process according to claim 1, wherein the natural ground calcium carbonate (NGCC) has a content of calcium carbonate of ≥96 wt.-%, based on the total weight of the natural ground calcium carbonate (NGCC).

13. The process according to claim 1, wherein the natural ground calcium carbonate (NGCC) has a weight median diameter $d_{50}$ in the range from 1 to 4 µm.

14. The process according to claim 5, wherein the slaking additive is selected from the group consisting of organic acids, organic acid salts, sugar alcohols, monosaccharides, disaccharides, polysaccharides, gluconates, phosphonates, lignosulfonates, and mixtures thereof.

15. The process according to claim 6, wherein the slaking additive is added in an amount of 0.1 to 1 wt.-%, based on the total amount of calcium oxide containing material.

16. The process according to claim 6, wherein the slaking additive is added in an amount of 0.01 to 0.2 wt.-%, based on the total amount of calcium oxide containing material.

17. The process according to claim 1, wherein the obtained suspension of precipitated calcium carbonate has a solids content of from 10 to 45 wt.-%, based on the total weight of the suspension.

18. The process according to claim 1, wherein the obtained suspension of precipitated calcium carbonate has a solids content of from 12 to 25 wt.-%, based on the total weight of the suspension.

19. The process according to claim 8, wherein the milk of lime is screened after step iii) and before step iv), with a screen having a sieve size from 100 to 300 µm.

* * * * *